US006904054B1

(12) United States Patent
Baum et al.

(10) Patent No.: US 6,904,054 B1
(45) Date of Patent: Jun. 7, 2005

(54) SUPPORT FOR QUALITY OF SERVICE AND VERTICAL SERVICES IN DIGITAL SUBSCRIBER LINE DOMAIN

(75) Inventors: Robert T. Baum, Gaithersburg, MD (US); Eric A. Voit, Bethesda, MD (US)

(73) Assignee: Verizon Communications Inc., New York, NY (US)

( * ) Notice: Subject to any disclaimer, the term of this patent is extended or adjusted under 35 U.S.C. 154(b) by 325 days.

(21) Appl. No.: 09/635,695

(22) Filed: Aug. 10, 2000

(51) Int. Cl.[7] ............................................. H04L 12/28
(52) U.S. Cl. ..................................... 370/467; 370/401
(58) Field of Search ............................... 370/394, 395, 370/397, 399, 401, 409, 412, 465, 466, 467, 470, 474

(56) References Cited

U.S. PATENT DOCUMENTS

| | | | |
|---|---|---|---|
| 5,247,347 A | | 9/1993 | Litteral et al. |
| 5,410,343 A | | 4/1995 | Coddington et al. |
| 5,621,728 A | | 4/1997 | Lightfoot et al. |
| 5,790,548 A | | 8/1998 | Sistanizadeh et al. |
| 5,812,786 A | | 9/1998 | Seazholtz et al. |
| 5,905,781 A | | 5/1999 | McHale et al. |
| 5,915,008 A | * | 6/1999 | Dulmand ..................... 379/201 |
| 6,081,517 A | | 6/2000 | Liu et al. |
| 6,108,350 A | * | 8/2000 | Araujo et al. ................ 370/467 |
| 6,118,785 A | * | 9/2000 | Araujo et al. ................ 370/401 |
| 6,301,229 B1 | * | 10/2001 | Araujo et al. ................ 370/252 |
| 6,363,065 B1 | * | 3/2002 | Thornton et al. ............ 370/352 |
| 6,388,990 B1 | * | 5/2002 | Wetzel ......................... 370/230 |
| 6,580,727 B1 | * | 6/2003 | Yim et al. .................... 370/463 |
| 6,584,074 B1 | * | 6/2003 | Vasamsetti et al. .......... 370/254 |
| 6,643,253 B1 | * | 11/2003 | Smith .......................... 370/217 |

FOREIGN PATENT DOCUMENTS

GB  0748142 A2 * 12/1996 ........... H04Q/11/04

* cited by examiner

Primary Examiner—Alpus H. Hsu
Assistant Examiner—Toan Nguyen
(74) Attorney, Agent, or Firm—Leonard C. Suchyta, Esq.; Joel Wall; Rader, Fishman & Grauer

(57) ABSTRACT

Offering vertical services to subscribers and service providers is an avenue to immediately improve the competitiveness of digital subscriber line access service, for example of the type offered by a local exchange carrier. To deliver high-quality vertical services, however, the underlying ADSL Data Network (ADN) or the like needs to establish Quality of Service (QoS) as a core characteristic and offer an efficient mechanism for insertion of the vertical services. The inventive network architecture introduces QoS into the ADN, in a manner that enables the delivery of sophisticated and demanding IP-based services to subscribers, does not affect existing Internet tiers of service, and is cost-effective in terms of initial costs, build-out, and ongoing operations. The architecture utilizes a switch capable of examining and selectively forwarding packets or frames based on higher layer information in the protocol stack, that is to say on information that is encapsulated in the layer-2 information utilized to define normal connectivity through the network. The switch enables segregation of upstream traffic by type and downstream aggregation of Internet traffic together with traffic from a local vertical services domain.

78 Claims, 8 Drawing Sheets

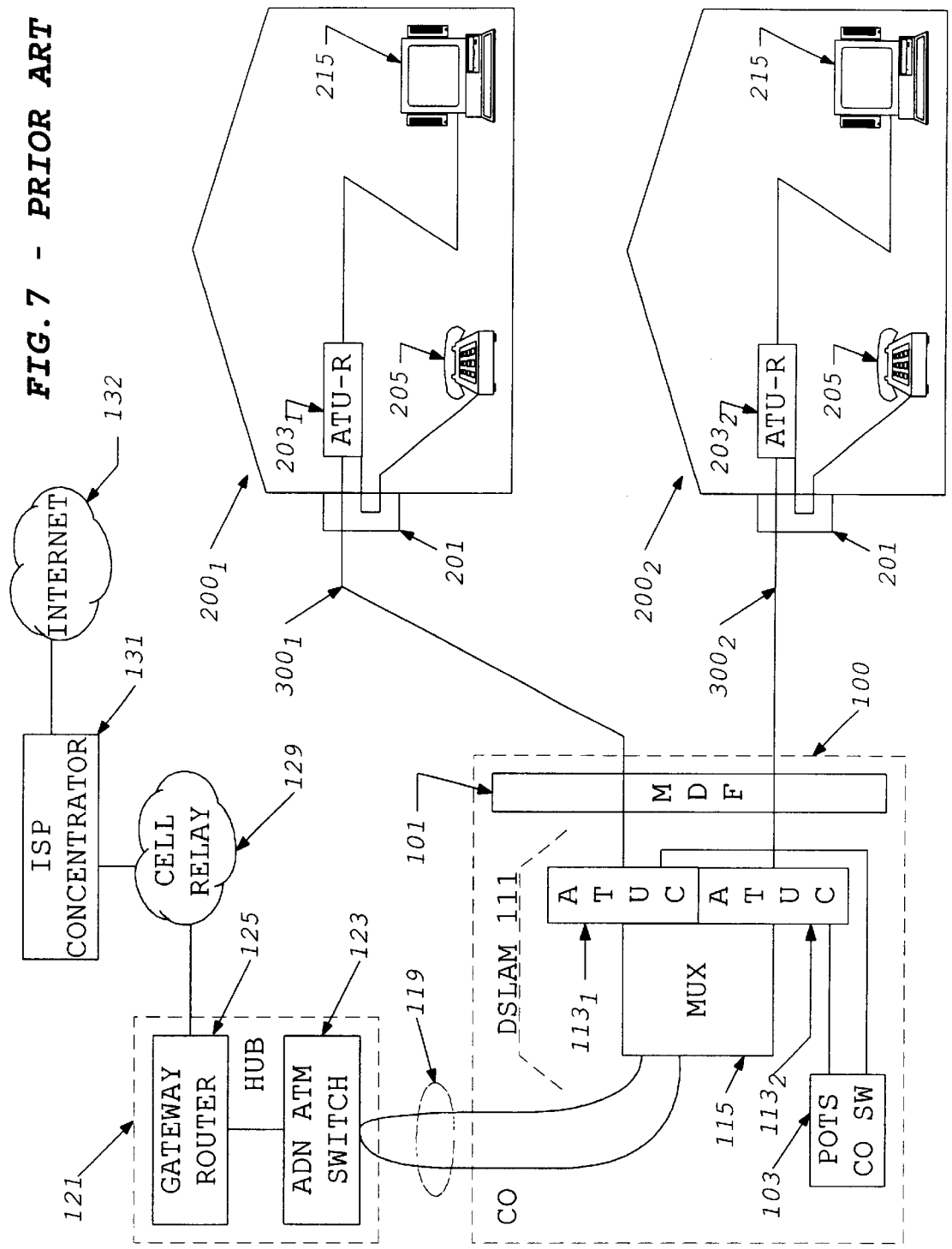
FIG. 7 - PRIOR ART

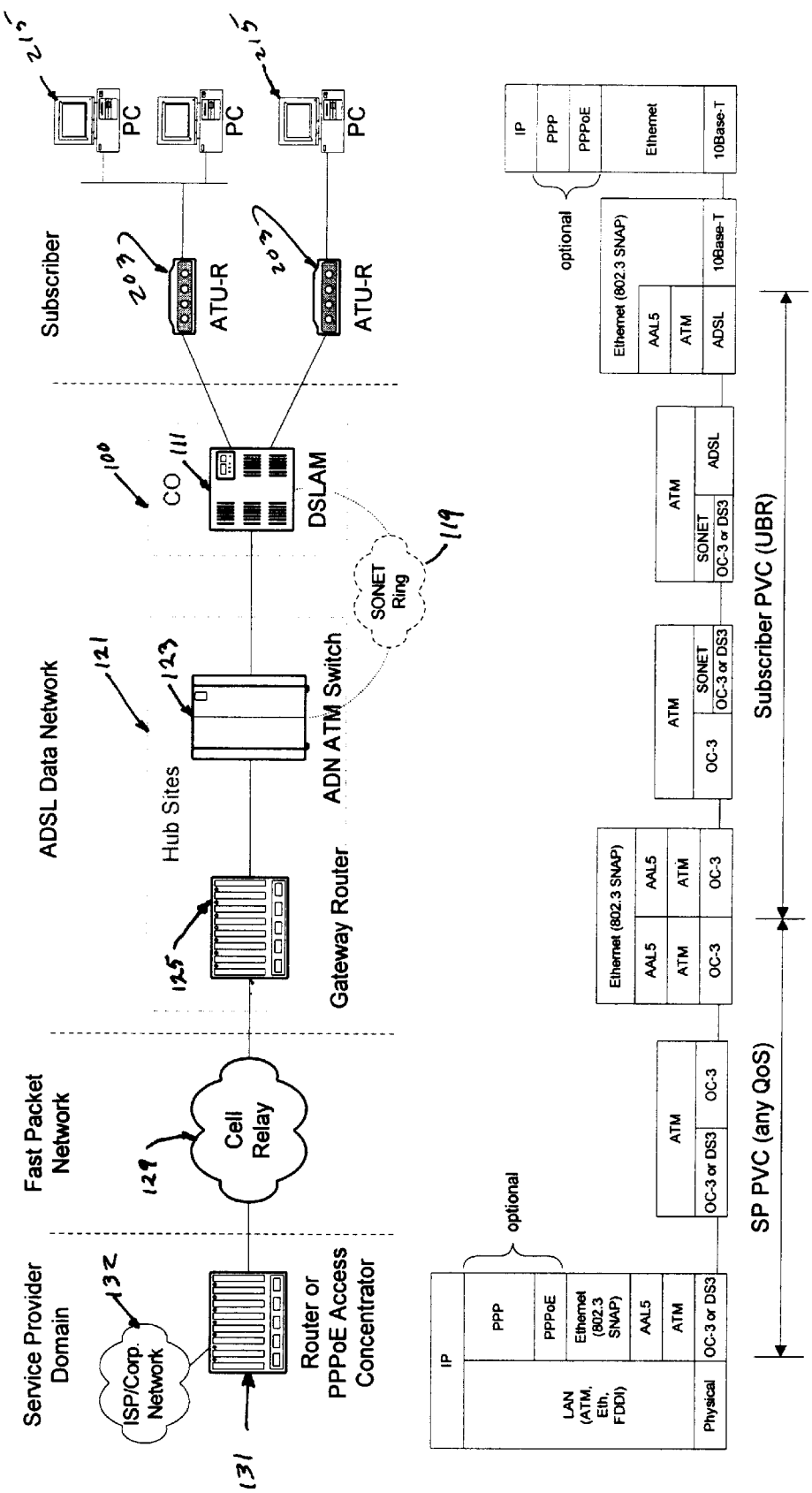
FIG. 8 - PRIOR ART

SUPPORT FOR QUALITY OF SERVICE AND VERTICAL SERVICES IN DIGITAL SUBSCRIBER LINE DOMAIN

FIELD OF THE INVENTION

The concepts involved in the present invention relate to techniques for implementing data communication services, for example in a local access network utilizing digital subscriber line technology, to support quality of service (QoS) and local introduction of vertical services.

BACKGROUND

Modern society continues to create exponentially increasing demands for digital information and the communication of such information between data devices. Local area networks use a network, cable or other media to link stations on the network for exchange of information in the form of-packets of digital data. These networks have proven quite successful in providing data communications in commercial applications. However, the common local area network architectures require installation of specialized wiring and use of specific wiring topologies. For example, the most popular network protocols, such as Ethernet, require special rules for the wiring, for example with regard to quality of wire, range of transmission and termination. Furthermore, to extend communications to a wider domain still requires connection of at least one node of the local area network out to a wider area network, such as the network of an Internet Service Provider (ISP). High speed links enabling such wide area access from LAN domain, for example using T1 lines, are quite expensive and justified only for hi-end commercial users.

The most common form of computer-to-computer communication in use today, particularly for wide area communications, still relies on modems and analog telephone network connections. The telephone-based operation provides the voice grade analog modem a unique power, the necessary connections are virtually ubiquitous. Such modems can communicate via almost any telephone line or wireless telephone (e.g. cellular) to any other such telephone connection, virtually anywhere in the world. The telephone network, however, was designed to provide approximately 3.3 kHz of analog voice bandwidth. Consequently, the data rates that are possible through the telephone network are quite low. Even with a variety of recent enhancements, the data speeds remain at or below 56 kbps.

Integrated Services Digital Network (ISDN) offers somewhat faster data communications and the capacity for concurrent data and voice telephone services. The 160 kb/s capacity carries two bearer (B) channels, each at 64 kb/s, one data (D) channel at 16 kb/s and overhead information in a 16 kb/s embedded operations channel (EOC). The two B-channels may be used separately, for example, for one voice telephone call and one data communication session. The D-channel typically is used for signaling, for call set-up and the like. Some applications allow aggregation of the channels, to combine the B-channels and possibly the D-channel to provide data communications up to the combined rate of 144 kb/s. However, these data rates offered by ISDN already are too slow for many multimedia applications. The high-speed and wide availability of modern personal computers (PCs) continually gives rise to ever more sophisticated multimedia applications. Communications for such applications, typically between the PC and the Internet, already are driving the need for speed to rates far above those available on normal ISDN lines.

A number of technologies are being developed and are in early stages of deployment, for providing substantially higher rates of data communication, for example ranging form 640 kb/s to 7.1 Mb/s. For example, cable television companies are now beginning to offer 'cable modem' services, which allow customers to communicate data over available bandwidth on the coaxial cable of a cable television network. After considering several other options, a number of the local telephone carriers are working on enhancements to their existing copper-wire loop networks, based on various xDSL technologies.

The term xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

The telephone carriers originally proposed use of ADSL and similar high-speed technologies to implement digital video services, for example in networks sometimes referred to as video 'dialtone' networks. The ADSL line technology provided a mechanism for high-speed transport of MPEG encoded video information to video terminal devices in the customers' homes. Examples of such ADSL-based video dialtone networks are disclosed in U.S. Pat. Nos. 5,247,347, 5,410,343 and 5,621,728. The carriers are now deploying a range of xDSL data services targeted at high-speed Internet access and high-speed access to private data networks. U.S. Pat. No. 5,790,548 to Sistanizadeh et al. discloses an example of an ADSL based data network, e.g. for high-speed access to the Internet and to corporate LANS.

The current design goals of DSL data networks for Internet access do not support high-end vertical services, that is to say services demanding IP-based applications that require assurance of some level of quality of service (QoS). For example, packet-switched Voice over IP (VOIP) requires low latency, low jitter (i.e., a relatively constant bit rate), and non-correlated packet loss. Streaming video has similar requirements, and in addition, requires high bandwidth. DSL data networks designed to support high speed Internet and Intranet access have been optimized to support traffic that is bursty and is not sensitive to latency or jitter. For example, current implementations supporting ATM cell traffic employ the Unspecified Bit Rate (UBR) class of service, which does not provide any bandwidth or delay guarantees. Consequently, transport of video materials through such DSL data networks inflicts video delays, loss of audio/video synchronization, and image fragmentation.

Furthermore, lengthy bandwidth intensive sessions for video or other broadband applications may degrade the throughput to all other subscribers served through a shared node, such as a gateway router or a concentrated link. For two-way video, upstream will have even worse quality and throughput problems, due to the best effort nature of the DSL data network implemented for Internet access and because the upstream bandwidth is significantly less than that of the downstream channel.

To appreciate the situation and problems, it may be helpful here to consider an ADSL data implementation of a local access network, as a representative example, in somewhat more detail. FIG. 7 is a block diagram of a typical ADSL data network of the type currently in-use by a number of incumbent and competitive local exchange carriers to provide high-speed access to Internet Service Providers (ISPs) and thus to the Internet. FIG. 8 provides an alternative functional illustration of the elements of such a network. Of particular note, FIG. 8 shows the various protocol stacks in association with the appropriate network elements.

As shown in FIG. 7, a central office (CO) 100 provides plain old telephone service (POTS) and digital subscriber line data service for a number of customers. For purposes of discussion, assume that the equipment at each of the various customer premises 200 connects directly to the CO 100 via twisted pair type copper wiring 300. In an actual implementation, many customers may connect through such wiring to a remote terminal linked to the CO via optical fiber.

At each customer premises 200 in our example, the copper loop 300 carrying both the POTS and ADSL signals connects through a Network Interface Device (NID) 201 placed at the side of the home. A two pair loop is installed from the NID to the location where the ADSL unit 203, typically an ATU-R modem, is located in the home. One pair connects all of the signals on the line 300 from the NID 201 to the ADSL modem 203. Within the ATU-R type modem 203, a passive splitter/combiner type filter segregates the POTS signal and the data signals. The POTS signal is transmitted over the second twisted pair back to the NID 201. The POTS line is then connected to the in-home wiring extensions at the NID 201, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 or other data device (FIG. 8) also sends data to the ADSL modem 203. The modem 203 modulates the upstream data and transmits appropriate signals over the line $300_1$ or $300_2$ to the corresponding modem $113_1$ or $113_2$ in the CO 100 (FIG. 7). The ATU-R interface may support bridging, such that multiple users can share the ADSL modem 203, for two-way data communication through the CO 100.

The lines 300 for the customer premises 200 connect through the main distribution frame (MDF) 101 to a Digital Subscriber Line Access Multiplexer (DSLAM) 111. The DSLAM includes a bank of ADSL terminal units of the type intended for central office applications, identified as ATU-Cs 113. The DSLAM also includes a multiplexer/demultiplexer (MUX) 115.

Within the DSLAM 111, each customer line 300 connects to an assigned ADSL terminal unit 113 in the central office (ATU-C). In the example illustrated, the first customer's line $300_1$ connects through the MDF 101 to a first ATU-C $113_1$ in the CO 100. The second customer's line $300_2$ connects through the MDF 101 to a second ATU-C $113_2$ in the CO 100. The ATU-C type ADSL units 113 include appropriate frequency dependent combiner/splitters, for segregating out the voice telephone traffic. Thus each ADSL unit 113 provides a connection for telephone traffic from the associated line 300 to the POTS switch 103.

The ADSL units 113 in the CO (ATU-Cs) essentially act as modulator/demodulators (modems) for sending and receiving data over the .subscriber telephone lines 300. On the network side, each of the ATU-Cs 113 connects to the MUX 115. The MUX 115 multiplexes and demultiplexes the upstream and downstream data for the ADSL modems 113 and provides a connection to a high-speed link 119. Through subtending, the MUX 115 may also provide a data concentration for the communications over the link 119.

In a typical implementation, the concentrated data communications utilize a DS-3 link 119. However, because of increasing traffic demands, it is becoming necessary to upgrade the link 119 to SONET optical fiber, such as OC-3 or in some cases even OC-12. The link 119 provides two-way data communication between the central office 100 and a data hub 121. In practice, this is a relatively long or wide area link using expensive interoffice facilities.

On the upstream side, the high-speed interoffice link 119 terminates on an ATM switch 123 for the ADSL data network (ADN). Although only one link 119 appears in the drawing, the asynchronous transfer mode (ATM) switch 123 will typically service a number of DSLAMs 111 in various end offices via similar DS or OC links. The ATM switch 123, in turn, provides a high-speed connection to a gateway router 125 coupled to an ATM cell relay network 129. Typically, the ATM switch 123 will aggregate traffic from a number of such links 119 onto an OC-3 or higher rate SONET link to the router 125. The router 125 and the cell relay network 129 enable transport of ATM cells for the subscribers to and from equipment of one or more Internet Service Providers (ISPs), shown by way of example as a concentrator 131 coupled to the public packet switched network commonly known as the Internet 132.

The illustrated local access type ADN network provides ATM cell transport from a customer premises 200 to the ISP concentrator 131. The ATM cells serve as the layer-2 routing or switching protocol for the lowest level definition of connectivity between two points of the network. Higher level protocols ride within the ATM cells.

The ATU-Rs 203 and the customer premises data equipment 215 connect via an Ethernet coupler. The customers' equipment communicates across the ADSL data network utilizing Ethernet, and the wide area communication involves transport of Internet protocol information typically in TCP/IP frames within Ethernet frames. The Ethernet frames carrying the TCP/IP frames are adapted into ATM cells. Attention is directed to the protocol stacks illustrated in the lower half of FIG. 8.

To efficiently provide cell relay, each customer is assigned an ATM virtual circuit that extends from the ATU-R 203 in the respective customer premises 200 to the gateway router 125. Although it was originally envisioned that ATM would support switched logical channels or virtual circuits, to date, such logical switching has proven impractical to implement and administer. Consequently, current practical ATM networks actually utilize permanent virtual circuits, not switched virtual circuits. For a given subscriber, the carrier therefore provisions an ATM permanent virtual circuit from the ATU-R 203 to the gateway router 125. The carrier programs one or more nodes along the path of that logical circuit, particularly the DSLAM 111, to regulate traffic on the virtual circuit to the upstream and downstream rates corresponding to the grade of service to which the particular customer subscribers. All data traffic for the subscriber goes over the entire length of the permanent virtual circuit, and most if not all nodes along that path limit that traffic to the rates of the subscription as defined in the provisioning data.

The virtual circuit may be thought of as a solid pipe. All traffic passes through the entire length of the pipe-like virtual circuit, regardless of how many switches or other nodes the circuit passes through. The layer-2 protocol defining the circuit carries all of the higher level traffic end-to-end. Higher layer protocols are visible only at the ends of the pipe. Hence, any traffic flow processing intended to utilize the higher layers must occur at some point past one end or the other end of the virtual circuit.

The gateway router 125 also terminates permanent virtual circuits through the cell relay network 129 going to/from the ISP concentrators 131. The gateway router 125 aggregates traffic between a number of subscribers and each respective ISP. The ISP equipment 131 typically implements a variation of a point-to-point protocol (PPP) specifically adapted to ride over Ethernet, referred to as "PPP over Ethernet" (PPPoE). The virtual circuits to the ISPs, however, do not have sufficient capacity to simultaneously carry all subscriber traffic at the maximum rates of the customers' subscriptions. The MUX I 15, the ATM switch 123, and the gateway router 125 concentrate and regulate the subscriber traffic going to and from the ISPs, typically on some type of "best efforts" basis.

In a typical Internet access service offering, the most expensive service tier provides 7.1 Mbps for downstream communication and 680 kbps for upstream communication. The next grade of service provides 1.6 Mbps for downstream communication and 90 kbps for upstream communication, whereas the lowest tier of service provides 640 kbps for downstream communication and 90 kbps for upstream communication. The maximum grade of service offered to an individual subscriber depends on the rates for which the subscriber's line can qualify, although the subscriber may opt for a lower rate service since the higher-rate service is more expensive.

The approach outlined above relative to FIGS. 7 and 8 works well for Internet access if the traffic relates to web access, file transfers and the like, which do not require guaranteed quality of service. Various segments of the Internet industry, however, are rapidly developing new multimedia services and applications that already are pushing the capabilities of such a network. For example, increasingly, Internet traffic includes a number of types of communication that require a guaranteed quality of service. Voice telephone communication over IP is extremely sensitive to latency and jitter. The permanent virtual circuits provide an unspecified bit rate (UBR) service and do not guarantee any minimal amount of delay or jitter. Also, because the rates are set by subscription, the service tends to be relatively inflexible. Some services, such as multicasting of broadband information from the Internet into the local access ADN for a large number of concurrent users, can quickly overload one or more nodes or critical links of the network, for example the link 119 between the DSLAM 111 and the ATM switch 123 at the hub 121.

Most industry experts propose to increase the services available via the public Internet. However, because the higher layer protocols are visible only on the Internet side of the virtual circuit "pipe," these services all must be implemented out past the end of the virtual circuit, at least behind the gateway router 129 and most likely in the public network, where it is possible to view and route based on higher level protocols, particularly Internet protocol (IP). Such a migration strategy to implement new services creates severe problems. For example, in the network of FIG. 7, if a customer at premises 200, desired to order a video on demand, the customer would communicate via the assigned permanent virtual circuit and the ISP to a server on the Internet 132. The server would send the video stream back through the Internet 132, the ISP equipment 131, the cell relay network 129 and the virtual circuit from the router 125 to the ATU-R 203 for handoff to a PC or the like at 215. If the rate of the requested video exceeds the customer's subscription rate, the customer could not view the video in real time during the download. Even if the rate of the requested video is below the customer's subscription rate, loading in the Internet or the local access network may impose delays and/or jitter in communication of some segments of the requested video. Assuming that the hub 121 and the links 119 implement a subscriber concentration, ordering of videos or similar broadband files from the Internet 132 quickly consumes the shared resources through the hub 121 and the links 119, reducing the rates of service provided to other customers seeking concurrent Internet access.

It might be possible to increase the capacity of the links 119 and/or the hubs 121; however, this tends to increase the carrier's recurring costs and often makes the overall service (s) of the ADN network economically impractical.

It has also been suggested to provide customers guaranteed quality of services for some portion of their communications, by segregating the traffic carried between the customer premises and the hub 121. This would require assigning a plurality of ATM permanent virtual circuits to each subscriber, one for each different guaranteed level of quality of service and one for all other Internet traffic for the subscriber. Administration and provisioning of one virtual circuit per subscriber is already complicated, and the number of virtual circuits through any given ATM node is limited by current equipment designs. Expanding the number of permanent virtual circuits per subscriber to support multiple QoS tiers of service therefore would be quite expensive, and the management thereof would become a nightmare. To support an increased number of virtual circuits, many having guaranteed QoS requiring some substantial minimum rate at all times, would also require that the operator substantially upgrade the network to increase the end-to-end capacity all the way to the wide area network 132.

Furthermore, to actually receive the desired QoS requires that all elements involved in the communication must guarantee the desired level or quality of service. For communications across the public Internet 132, this means that various nodes and links on the public Internet must be available and capable of providing a guarantee of the desired QoS. In point of fact, few nodes on the public Internet actually support any type of QoS. Hence, even if the ADN supported a desired QoS, most subscribers would not benefit from that service because their communications over the public Internet would have no QoS guarantee, and would suffer from the usual problems of latency and jitter.

Consequently, current deployments of ADSL-based data networks, such as shown in FIGS. 7 and 8 generate many customer complaints. From the customer perspective, the service does not deliver the data rates that the customer pays for on a consistent basis. The customer typically blames such problems on network equipment failure. In fact, most of the problems already are due to virtual circuit congestion problems, of the kinds outlined above. Essentially, the ADN network is crippled by the unpredictable nature of the service levels that the customers perceive due to congestion on the ADN and on the public Internet.

Also, with this approach, because all of the major service elements are implemented in servers accessible to the Internet, all of the services are subject to severe security risks. Each service provider's server is accessible to virtually any computer coupled for communication via the Internet. This openness is a desirable feature of the public Internet. However, a consequence is that any such server is accessible to and thus subject to attack from any hacker having Internet communications capabilities. Popular services, particularly those generating substantial revenues, become prime targets for attack.

Another area of problems is that the ADN does not offer the carrier any technique for offering its own differentiated service applications. To compete with other service providers, the carrier operating the ADSL-based data network needs to introduce its own multimedia services, for example, its own video services to compete with video services of cable television companies (that offer competing Internet access services). As noted above, however, introduction of a new service, such as true video on demand or broadcast video requires communications via the public Internet 132. This is true even if the carrier operating the network of FIGS. 7 and 8 wanted to initiate its own video service(s).

Hence, there is an ongoing need to improve the architecture and operation of a digital subscriber line data communication network, particularly to facilitate finer gradation of services within the local network. The need, first, is for such a local network to support introduction of services on a 'vertical' basis within the local access network separate and apart from the common forms of Internet traffic, both for commercial differentiation and for increased security. In a related need, the local network needs to support a number of different levels of quality of service (QoS).

SUMMARY OF THE INVENTION

A general objective of the invention is to implement an enhanced digital communication network for subscriber lines that supports vertical introduction of new communication and/or multimedia services.

A further objective is to support multiple levels or grades of quality of service within the access network.

Another objective of the invention relates to improvement of the cost effectiveness of the data network, for example, by reducing the demand for high-capacity interoffice links while increasing the bandwidth available at the network edge for at least some types of services.

A related objective is to provide a technique for introduction of new high-end services near the network edge, from a domain that is more secure and therefore less subject to hacker attacks.

A further objective of the invention is to support QoS and/or local introduction of vertical services, without the need to assign multiple virtual circuits or the like to each subscriber.

Aspects of the invention relate to unique methods and network architectures for providing a combination of wide area internetwork service and vertical communication services via a local access network. Other aspects of the invention relate to a particular switch developed to facilitate a unique form of routing, for example to support of QoS and vertical service insertion.

Hence, a first aspect of the invention relates to a method of segregating traffic for at least two different network domains. The method involves establishing a contiguous layer 2 protocol connectivity, upstream from a customer premises to a communication access node coupled to a first network domain. At an intermediate point along the contiguous connectivity, at least two types of upstream transmissions from the customer premises are distinguished, based on information encapsulated within the layer-2 protocol. The methodology forwards each distinguished transmission of a first transmission type from the intermediate point to the first network domain. Similarly, the method entails forwarding each detected transmission of a different second type from the intermediate point to a second network domain, which is logically separated from the first network domain.

Another method aspect of the invention involves providing a combination of access to two different network domains through an access data network. In this case, the actual method includes a step of provisioning a logical communication circuit extending from a customer premises through the access data network to a communication access node coupled to a first network domain. This provisioning comprises defining the logical communication circuit in terms of a layer-2 protocol. An intermediate node along the logical communication circuit examines communicated information in transmissions from the customer premises, for a protocol encapsulated within the layer-2 protocol, in order to distinguish transmission types. The method also includes steps of forwarding transmissions of two different types. A first type of detected transmission is forwarded from the intermediate node to the communication access node, over the logical communication circuit defined in terms of the layer-2 protocol. A second type of detected transmission is forwarded to a second network domain logically separate from the first network domain.

Another aspect of the invention relates to a method involving providing rate adaptive digital subscriber line communications from a digital subscriber line access multiplexer to a plurality of subscribers, over respective subscriber lines. Consequently, the communications can operate at maximum rates that respective line conditions will allow. For each subscriber, wide area access services are provided from an access router node coupled to the digital subscriber line access multiplexer to a node coupled to a wide area internetwork. The rates for the access services conform to service level agreements with respective subscribers. For each subscriber, the method also entails aggregating and segregating communications for a vertical services domain with those for the wide area access services, for combined communication via the maximized-rate digital subscriber line communications.

From a somewhat different perspective, another inventive method offers a combination of wide area internetwork service and vertical communication services through a local access network. This method comprises provisioning a logical communication circuit to support a subscriber-selected grade of service to the wide area internetwork. The logical communication circuit extends from a customer premises of the subscriber to a communication access node coupled to the wide area internetwork. The provisioning involves defining the logical communication circuit in terms of a layer-2 protocol, for example in terms of an ATM virtual circuit. An intermediate node along the communication circuit examines communicated information in transmissions from the customer premises, for protocol layers higher than the layer-2 protocol. In this manner, the intermediate node distinguishes transmission types. The inventive method entails routing each detected transmission of a first type from the intermediate node, to the communication access node, over the logical communication circuit defined in terms of the layer-2 protocol, at a transmission rate corresponding to the subscriber selected grade of service. Each detected transmission of another type is extracted from the logical communication circuit at the intermediate node. The methodology routes each extracted transmission to a vertical services network coupled locally to the intermediate node.

Another feature of this later methodology relates to the processing of downstream communications. Here, the method further comprises receiving a first downstream transmission intended for the subscriber from the communication access node, at the intermediate node. This transmission is received over the logical communication circuit, at a downstream transmission rate corresponding to the subscriber-selected grade of service. The intermediate node also receives a second downstream transmission intended for the subscriber, from the vertical services network. The method entails inserting the second downstream transmission into the logical communication circuit, to combine the first and second downstream transmissions for communication over the logical communication circuit from the intermediate node to the customer premises.

Other inventive aspects embody a data communication network, for example, for providing a combination of wide area internetwork service and vertical communication services. The network comprises a communication access node coupled to a first network domain, such as the wide area internetwork. A physical communication circuit provides a coupling to customer premises communication equipment. The network also includes a logical communication circuit, for example provisioned to support a subscriber-selected grade of service to the first network domain. The logical communication circuit extends through the physical communication circuit and through the network, to the communication access node coupled to the wide area internetwork. The provisioning defines the logical communication circuit in terms of a layer-2 protocol. The network further comprises an intermediate communication node, coupled to the physical communication circuit at an intermediate location along the logical communication circuit. The intermediate communication node includes a controller for examining communicated information in transmissions from the customer premises, for one or more protocol layers encapsulated with the layer-2 protocol. This higher level examination enables the intermediate node to distinguish transmissions by type, for example by different Ethertype protocols carried in layer-2 type ATM cells. The intermediate communication node also includes a switch fabric, such as a router or the like, coupled to the logical communication circuit and responsive to the controller. This logical switch fabric enables forwarding of each detected transmission of a first transmission type from the intermediate node to the communication access node over the logical communication circuit. The transmissions forwarded to the communication access node preferably travel at a transmission rate corresponding to the subscriber-selected grade of service. The logical switch fabric also enables forwarding of each detected transmission of any other type from the logical communication circuit to a second network domain, such as the vertical services network.

From a somewhat different perspective, another inventive network aspect relates to a digital subscriber line data network. This data network provides a combination of wide area internetwork service and vertical communication services. The data network comprises a communication access node coupled to the wide area internetwork. Digital subscriber line transceivers, coupled to network ends of subscriber lines, provide data communication with transceivers coupled to customer premises ends of respective subscriber lines. Disclosed examples of the transceivers of the network are ATU-C units. The data network further comprises an access switch coupled to the digital subscriber line transceivers, for example through a multiplexer. The access switch receives data from customer premises equipment via respective digital subscriber line transceivers, and it supplies data intended for transmission to predetermined customer premises equipment to the respective digital subscriber line transceivers. The data network includes a high-speed data link between the access switch and the communication access node.

The network also includes a logical communication circuit provisioned in terms of a layer-2 protocol for each subscriber line. The logical circuit extends through the switch and the high-speed data link. In the preferred embodiments, each logical communication circuit is provisioned to support a respective subscriber-selected grade of service to the wide area internetwork and to extend from a respective customer premises to the communication access node. The inventive data network also comprises a vertical services network coupled locally to the access switch. A controller examines communicated information in upstream transmissions on each logical communication circuit, for protocol layers higher than the layer-2 protocol, to distinguish transmission types.

In operation, the access switch routes each detected transmission of a first transmission type, received from a customer premises over the respective logical communication circuit on the respective line, over the respective logical communication circuit on the high-speed data link to the communication access node. In the preferred embodiments, such communications travel at a transmission rate corresponding to the respective subscriber-selected grade of service. The access switch also forwards each detected transmission of any other type from the respective logical communication circuit to the vertical services network.

A still further inventive aspect relates to an implementation of a data switch for use in a communication network. The data switch comprises a first interface, for data communication to and from data equipment at a plurality of customer premises. The switch also includes a second interface, for communication with a first network domain, such as the wide area internetwork, over a low-layer protocol link carrying subscribers' traffic in accord with a first type of a higher level protocol. A third interface enables communication with a second network domain, via a second type of the higher level protocol.

The inventive data switch also includes a switch fabric coupled to the interfaces and a controller coupled to the switch fabric, for controlling routing of traffic through the fabric between the interfaces. Upstream transmissions, received through the first interface, are segregated and routed either to the second interface or to the third interface, depending on whether the transmissions utilize the first or second type of the higher level protocol, respectively. Downstream communications, received via the second and third interfaces for respective customer premises data equipment, are aggregated and routed through the first interface. In the preferred embodiment, the data switch implements a logical circuit, for example as an ATM permanent virtual circuit provisioned through the switch fabric from the first interface to the second interface for each customer premises.

Hence, the preferred embodiments alleviate the above noted problems by providing an intermediate node, typically an enhanced switch, to segregate upstream traffic based on analysis of the type of communication. This analysis utilizes protocol information contained in each communication, for a protocol higher than the switching protocol, that is to say higher than a protocol used to define the customer's logical circuit. In an implementation utilizing ATM, for example, the logical circuit is a virtual circuit, and the node examines the protocol information for layers above the ATM layer. One type of traffic remains on the virtual circuit, whereas other traffic is handed off to a vertical services domain. The node also provides a point to aggregate traffic from the from the vertical services domain with other traffic on the subscriber's logical circuit, for transport to the customer premises equipment.

To this end, the preferred embodiments use an ATM switch having routing/processing capabilities at the higher layer, for example at the layer-3 protocol or above, in close proximity to a DLSAM. The links between the DLSAM and this switch can be of any desired high capacity because they are short and therefore relatively low in cost. Consequently, the DSLAM and the new ATM switch can support relatively high bandwidth from that node to the customer premises. To utilize the increased bandwidth and support new services, the modems on the opposite ends of the digital subscriber line negotiate and operate at the maximum rate that the line conditions will permit.

The ATM switch essentially subdivides the traffic associated with each subscriber line. One branch goes to a gateway router and hence to one or more ISP(s) at the rate corresponding to the Internet access subscription. It may be helpful to consider this as long distance or wide area traffic for the subscriber. The other branch is for local traffic, to and from the locally connected vertical services domain. The interconnection to the vertical services domain supports QoS and introduction of vertical services not easily provided from the public Internet, such as video on demand, multicasting, and voice over IP. The vertical services domain is relatively secure since it is not accessible from the public Internet.

In operation, the access network will still support a logical circuit in the form of a virtual circuit to the gateway router for each customer, for example in the form of an ATM permanent virtual circuit. That circuit is provisioned for the subscriber's desired grade or quality of Internet access service. The subscriber line, however, supports at least the same and often a higher rate service, for example via rate-adaptive ADSL communication over a twisted wire line. In the upstream direction, the ATM switch examines at least one aspect of each data transmission relating to a logically higher level of protocol, e.g. in a layer 2 protocol encapsulated in ATM, or at layer 3, layer 4, or higher. From the higher level information, the switch determines the type of transmission and segregates the upstream transmissions on the subscriber's virtual circuit. One type of transmission continues on the virtual circuit, e.g. for Internet transport. Any and all other types, however, go to the vertical services domain. in the downstream direction, the ATM switch aggregates any communications coming from the vertical services domain together with downstream transmissions on the virtual circuit from the Internet.

The vertical services domain also represents a communication network. The vertical services domain, however, preferably takes the form of a data network optimized for local transport of vertically injected services, that is to say local data traffic. In view of its local nature, it is easier and more cost effective to provide high bandwidth services. The vertical services network, for example, could take the form of a giga-bit Ethernet type local area network. Also, it is easier to adapt the vertical services network to support service level agreements with customers with regard to quality of service. In many cases, it actually is sufficient to support QoS on the one hop through the ATM switch, itself.

To support the QoS requirements, a feature of the preferred embodiments involves certain queuing and tagging operations within the ATM switch. Essentially, the switch will maintain two or more queues for each permanent virtual circuit. The switch distinguishes the queues based on importance. As the switch receives cell transmissions for transport over the virtual circuit to the customer premises, the switch will internally tag each cell as to its importance level and place the cell in the appropriate queue. The switch may implement any one of a number of different algorithms to select and transmit cells from the various queues. The particular algorithm is selected to implement QoS in conformance with the subscriber's service level agreement with the carrier and/or agreements between the carrier and the vertical services providers.

Within the one virtual circuit assigned to the individual subscriber, the invention actually provides multiple tiers of service, preferably with multiple levels of QoS. Also, at different sections along the virtual circuit "pipe," the network provides different levels of rate shaping. All layers and all services are available at the home, but different services receive different treatments in the network conforming to the different levels of QoS. The inventive approach, however, does not require each subscriber to have multiple virtual circuits.

Services provided on the vertical services domain appear as IP data services. Virtually any communication service may utilize the vertical services network and through it to gain access to the carrier's local customer base, simply by providing an IP interface for coupling to the vertical services network. For example, it is a simple matter to connect any digital source of broadcast audio or video information, such as a direct satellite broadcast receiver system similar to those used today in residential applications, through an IP interface. Such a broadcast source and interface can provide the full range of received video services, over the vertical services network. The access data network may distribute the video programming to a number of access switches within a local geographic area. The switch provides an optimum point for frame or cell replication for multicasting services. Hence, in our video example, the switch replicates and distributes frames for the broadcast service over the digital subscriber line circuits to customers desiring to view the programming.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 7 a block diagram of a prior art asymmetrical digital subscriber line data network.

FIG. 8 is a slightly modified functional block diagram of the prior art network illustrating the protocol stacks used in the various network elements.

DETAILED DESCRIPTION OF THE PRESENTLY PREFERRED EMBODIMENTS

Figure 1:
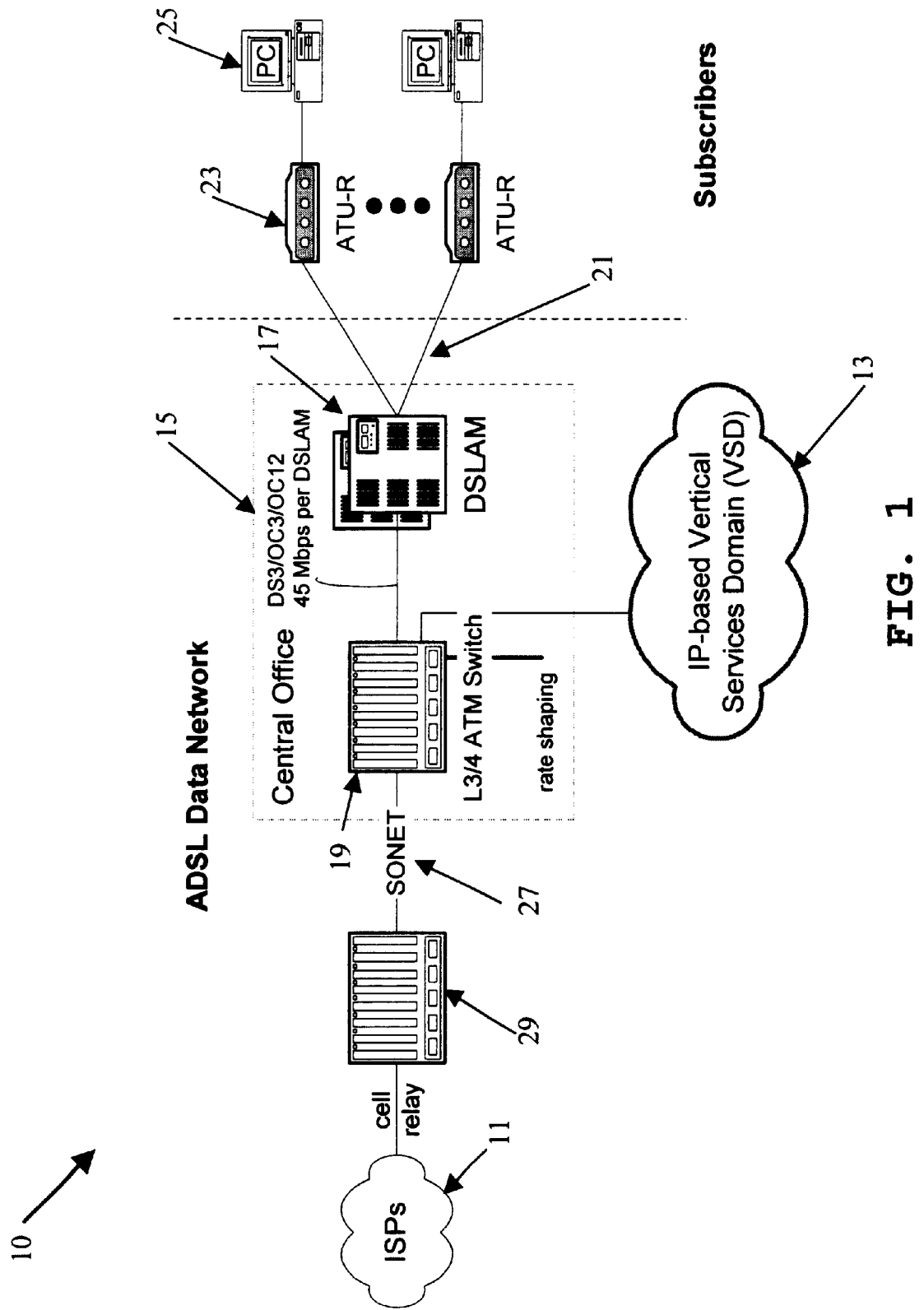
FIG. 1 is a functional block diagram of a digital subscriber line data network supporting enhanced services in accord with the inventive concepts.

The inventive network architecture introduces QoS into the ADN, in a manner that enables the delivery of sophisticated and demanding IP-based services to subscribers. The architecture does not affect existing Internet tiers of service such that the promised rates for such access appear the same as offered today. Also, the new architecture is cost-effective in terms of initial costs, build-out, and ongoing operations. The architecture utilizes an access switch or router capable of examining and selectively forwarding packets based on a relatively higher layer of the protocol stack, that is to say based on information encapsulated within the layer-2 information utilized as the lowest level definition of connectivity through the network. The access switch enables segregation of upstream traffic by communication type and downstream aggregation of wide area traffic together with traffic from a local vertical services domain.

In accord with the invention, the access switch examines the higher-level protocol information in the upstream communications to segregate traffic into two or more streams based on traffic type. A logical circuit provisioned for the subscriber extends from the customer premises through the switch to a node providing service to the packet switched network, typically on the Internet. The provisioning of this circuit defines a contiguous connectivity for the logical circuit, in the layer-2 protocol utilized by the network. Higher level protocols ride within this particular layer-2 protocol, including some protocols that are often considered themselves to be layer-2 protocols.

The analysis of upstream packets to determine higher-level type enables segregation of the upstream traffic into two or more upstream flows. For example, this allows the switch in the preferred embodiment to keep traffic bound for the packet switched internetwork on the logical circuit but route all other traffic onto another network, in this case a local network for vertical services. In the preferred embodiment, from the access switch or router to the packet switched network, the provisioning for the logical circuit limits the rate(s) of communication to those defined by the grade of service to which the customer subscribes. From the customer premises to the switch, however, the communications run at the optimum rates that the facilities can physically support, e.g. the maximum rates that the ADSL modems or the like can adaptively establish for the particular subscriber's line.

In the downstream direction, the switch aggregates traffic for each subscriber. The switch receives the rate-limited traffic from the packet switched network, on the subscriber's logical circuit. The switch also receives any downstream traffic intended for the subscriber, from the vertical services network. The switch combines this traffic and sends the combined communications downstream over the subscriber's logical circuit to the customer premises, at the optimum downstream rate that the subscriber's facilities can support.

Figure 2:
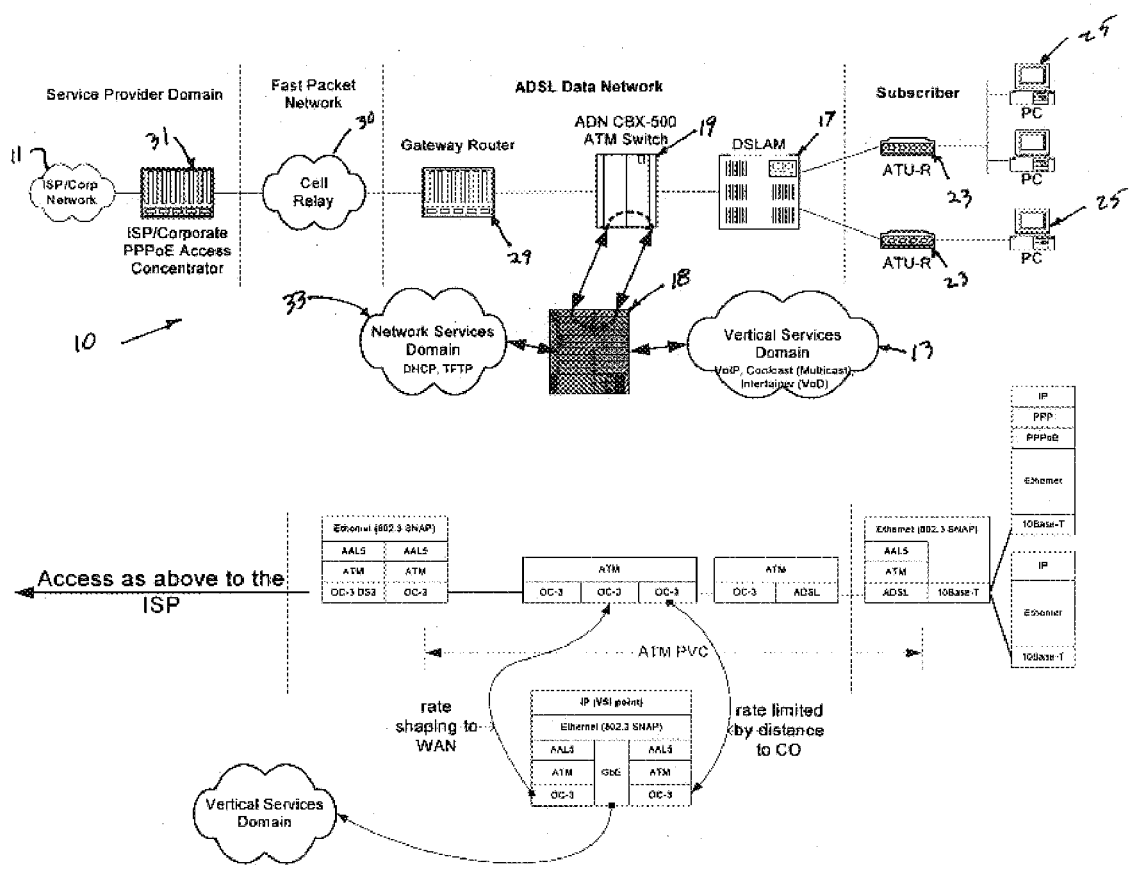
FIG. 2 is a slightly modified functional block diagram of network of FIG. 1, illustrating the protocol stacks used in the various network elements.

FIG. 1 provides a high-level functional illustration of an exemplary digital subscriber line network, specifically an ADSL data network 10, implementing the various concepts of the present invention. FIG. 2 provides an alternative functional illustration of the elements of such a network. Of particular note, FIG. 2 shows the various protocol stacks associated with the appropriate network elements that utilize those stacks. The end-user may be a single PC user or a small business or a residential LAN user. The data equipment of such users typically includes servers and PCs and may include a variety of other devices, such as fax machines, televisions, recorders and remote controlled appliances, having data communication capabilities.

The customer access link comprises an xDSL twisted pair, although those skilled in the art will recognize that the invention is readily adaptable to networks using other types of links to the subscriber premises. In the illustrated embodiment, the network 10 supports ADSL, which the carrier may offer in grades supporting 640 kbps, 1.6 Mbps or 7.1 Mbps (downstream) rates for Internet access. The actual communications over the DSL loops, however, run adaptively at the maximum rates that the line conditions allow.

The ADSL-based local access data network or "ADN" 10 provides access to two different network domains for communication services. The two network domains are logically separate. In most implementations, the first domain may be considered as a long distance or wide area domain, whereas the second domain is a local network domain. In the illustrated example, the ADN 10 provides access to a first domain in the form of a wide area internetwork, such as the public Internet, corporate local area networks (LANs), and the like, represented by the network cloud 11 for the ISPs. The high speeds available through the local network 10 enable a wide range of communications, for example, of text data, of video data, for multimedia, for web browsing, of transfers of files, for database searching, and the like via the network(s) 11.

In accord with the invention, the ADSL-based local access network 10 also offers access to a wide variety of other IP-based services through a local data network 13 serving as the vertical services domain (VSD). The vertical services typically are high-end services requiring certain QoS levels and often having a certain local characteristic. Examples of the vertical services are discussed in more detail later.

The vertical services network offers an efficient domain from which the carrier can locally inject high-end services and/or services of other local providers. Because the vertical services domain is separate from the public Internet, equipment providing the vertical services is subject to attacks directly from the public Internet.

As shown in FIGS. 1 and 2, a central office (CO) 15 comprises one or more DSLAMs 17 and L¾ ATM switch 19. Elements of the CO 15 providing plain old telephone service (POTS) have been omitted for simplicity of illustration, since they are generally similar to those shown in FIG. 7.

The switch 19 is designated as an "L¾" switch here as a matter of convenience, to illustrate that the switch 19 has the capability to make selective packet forwarding decisions based on protocol information at some level that is above the L2 level that the switch normally utilizes to define or establish logical circuit connectivity. It will be recognized, however, that some of the protocols, although higher than the ATM type level 2 protocol used by the preferred switch are themselves often thought of as level 2 protocols even though they are above or encapsulated in the ATM type level 2 information. Also, decisions as to the selective forwarding may be made in response to monitoring of any level of the protocol stack above the L2 level that the switch normally utilizes to define or establish logical circuit connectivity, for example from any level above ATM all the way up to the L7 application layer.

Returning to the discussion of FIGS. 1 and 2, for purposes of this discussion, assume that the equipment at the various customer premises connect directly to the CO 15 via twisted pair type copper wiring 21. In an actual implementation, many customers may connect through such wiring to a remote terminal linked to the CO 15 via optical fiber. Other hardwired, optical or wireless implementations of the digital subscriber lines are discussed later. In the illustrated embodiment, each line 21 from a customer premises connects to an ATU-C within one of the DSLAMs 17.

On the customer premises side, the digital subscriber line circuit 21 connects to an ADSL terminal unit (remote) or ATU-R 23. The ATU-R 23 is a modulator/demodulator (modem) for communicating over a twisted wire pair type line 21, in accord with the ADSL protocols. The ATU-R in turn connects to customer premises equipment, shown by way of example as a PC 25 at each location (FIGS. 1 and 2). Those skilled in the art will recognize that the customer premises equipment 25 may include a wide range of other types of devices having data communications capabilities (see e.g., FIG. 3).

The ADSL user's normal telephone equipment (not shown) also connects to the line 21, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Such modems may implement either one of two techniques for dividing the usable bandwidth of the telephone line to provide these channels. One approach is to divide the usable bandwidth of a twisted wire pair telephone line by frequency, that is to say by Frequency Division Multiplexing (FDM). The other approach uses Echo Cancellation. FDM uses one frequency band for upstream data and another frequency band for downstream data. The downstream path is then divided by time division multiplexing signals into one or more high-speed channels and one or more low speed channels. The upstream path also may be time-division multiplexed into corresponding low speed channels. With echo Cancellation, the upstream band and downstream band substantially over-lap. The modems separate the upstream and downstream signals by means of local echo cancellors, in a manner similar to that used in V.32 and V.34 modems.

The DSL modems may use a number of different modulation techniques to physically transport digital data streams. A number of implementations of the modems have used carrierless amplitude phase (CAP) modulation. Most current xDSL modems, however, utilize a discrete multi-tone (DMT) approach.

Returning to the discussion of the CO 15, the structure and operation of each DSLAM 17 is essentially the same as those of the DSLAM 111 in the embodiment of FIG. 7, except that the control functionality of the DSLAM 17 is somewhat different. The DSLAM 17 controls the ATU-Cs to implement a rate-adaptive ADSL service, to adapt operations so as to maximize data rates for the communications over the indiviual subscriber lines. Essentially, the ATU-Cs and ATU-Rs signal each other ever the lines to synchronize their modes of operation at parameter settings, which achieve optimum data throughput. Also, the DSLAM 17 does not need to monitor or limit the line rates, but instead relies on the rate-adaptive control algorithm to maximize the rates achieved over the ADSL circuits or provide rate-shaping for the ATM virtual circuits. Other network elements limit rates, where necessary.

The L¾ ATM switch 19 is co-located with the DSLAMs 17, within one central office 15. As a result, it is practical to connect the multiplexer within each of the DSLAMs 17 over a high-speed data link directly to an appropriate port of the ATM switch 19. Because these links are short, there is little or no cost imposed when implementing such links using wideband equipment. By itself, the co-location of the L¾ ATM switch 19 with the DSLAM(s) 17 does not increase bandwidth. Rather, it makes increased bandwidth at the network edge economically feasible, due to proximity. Co-location removes the requirement to purchase expensive wide area transport (the SONET ring) to increase bandwidth. In particular, the direct OC3/OC12 connections between the DSLAM 17 and the L¾ ATM switch 19 do not incur any recurring tariff expenses.

The ATM switch 19 connects through a SONET ring 27 to a gateway router 29 providing ATM transport through a cell relay network 30 (FIG. 2) the ISPs shown at network 11 in the drawings. Most of the ISPs will utilize a concentrator or other equipment as their point of presence for Internet access (FIG. 2). In the preferred embodiment, the equipment 31 provides a point-to-point protocol (PPP) interface designed for transport over Ethernet (PPPoE). The ATM switch 19 also provides a connection to the local implementation of the VSD network 13, for example via a giga-bit Ethernet port to a switch or other local network elements 18.

The illustrated local access type ADN network 10 provides ATM cell transport from the customer premises to the ISP network(s) 11. The ATM cells serve as the layer-2 protocol for defining contiguous switched connectivity. Higher level routing protocols, such as Ethernet and TCP/IP frames, ride within the ATM cells. Services of different types utilize different protocols at one or more layers above the ATM cell layer. In the preferred embodiments, all communications utilize Ethernet. However, communications to and from the ISPs use the noted PPPoE type Ethernet protocol. In contrast, communications to and from the vertical services domain use one or more of the other Ethertype protocols.

To efficiently provide cell relay, each customer is assigned a virtual circuit that extends from the ATU-R 23 in the respective customer premises to the gateway router 29. This logical circuit is defined at the layer-2 protocol level. The present implementations implement this logical communication circuit as an ATM permanent virtual circuit, although the inventive concepts may apply to other types of logical circuits or channels.

The gateway router 29 is the communication node of the access network 10 providing access to the wide area IP packet networks, of corporations or more often of Internet Service providers. The gateway router 29 terminates permanent virtual circuits through the cell relay network 30, from the equipment 31 of each such wide area packet network provider 11. The gateway router 29 also terminates the permanent virtual circuits from the subscribers through the data network 10. For communication with a selected ISP network 11, for example, the gateway router 29 routes cells from the permanent virtual circuit from the subscriber through to the permanent virtual circuit of the selected ISP network 11. In the opposite direction, the gateway router 29 routes cells from the permanent virtual circuit from the selected ISP network 11 through to the permanent virtual circuit of the particular subscriber.

For the leg of the subscriber's logical circuit, extending from the L¾ ATM switch 19 through the gateway router 29, the carrier programs one or more nodes along the path behind the DSLAMs 17, to regulate traffic on the virtual circuit to the rate corresponding to the grade of Internet access service to which the particular customer subscribes. In the preferred embodiment, at least one such node performing this rate shaping function is the L¾ ATM switch 19. All traffic going to and from the ISP network(s) 11 therefore is still limited to the rates defined in the service level agreement (SLA) for Internet access that the carrier has with the particular customer.

The portion of the virtual circuit extending between the ATM switch 19 and the ATU-R 23, however, is not rate limited but instead runs at the maximum rate that the line will support using the rate-adaptive ADSL modem operation. In most cases, the rate-adaptive ADSL modem operation will support rates substantially higher than the subscription rate for Internet access service.

The L¾ ATM switch 19 also provides the interconnection to the subscriber's virtual circuit for insertion of downstream traffic from the vertical services domain 13 and separation of upstream traffic from the subscriber's virtual circuit going to the vertical services domain 13. In accord with the invention, decisions as to whether upstream traffic is destined for the vertical services domain 13 or should remain on the subscriber's virtual circuit going through the gateway router 29 and the cell relay network 30 to the ISPs 11 is based on an analysis of traffic type. The traffic type analysis relies on protocol information contained in the communications, which relates to layers of the protocol stack that are higher than the layer-2 switching protocol, in this case above the ATM layer.

As shown in FIG. 2, traffic destined for an ISP 11 utilizes a variation of a point to point protocol (PPP) intended to run on top of Ethernet, referred to as PPP over Ethernet or "PPPoE." A 'type' indicator contained within the Ethernet frames identifies the PPPoE protocol. In contrast, traffic going to and from the vertical services domain utilizes other 'types' of Ethernet protocol. All traffic to and from the customer premises uses Ethernet frames carried within ATM cells.

The switch 19 therefore routes a subscriber's traffic going to and from an ISP 11, upon detection of the PPPoE indicator in the level 3 data contained within the Ethernet cells. This traffic will also utilize public IP addressing. In contrast, the ATM switch 19 routes a subscriber's traffic going to and from the vertical services domain, upon detection of any other type of Ethernet protocol at level 3 or above in the protocol stack. The IP addressing in the vertical services domain 13 utilizes private-IP addresses, for example, as administered with a DHCP server (not shown) coupled to the network cloud 33. Although shown separately, the cloud 33 may be implemented as a portion of the network providing the physical elements of the vertical services domain. The portion 33, however, would typically be a logically separate domain that the carrier controls and restricts for its own network administration use.

Figure 3:
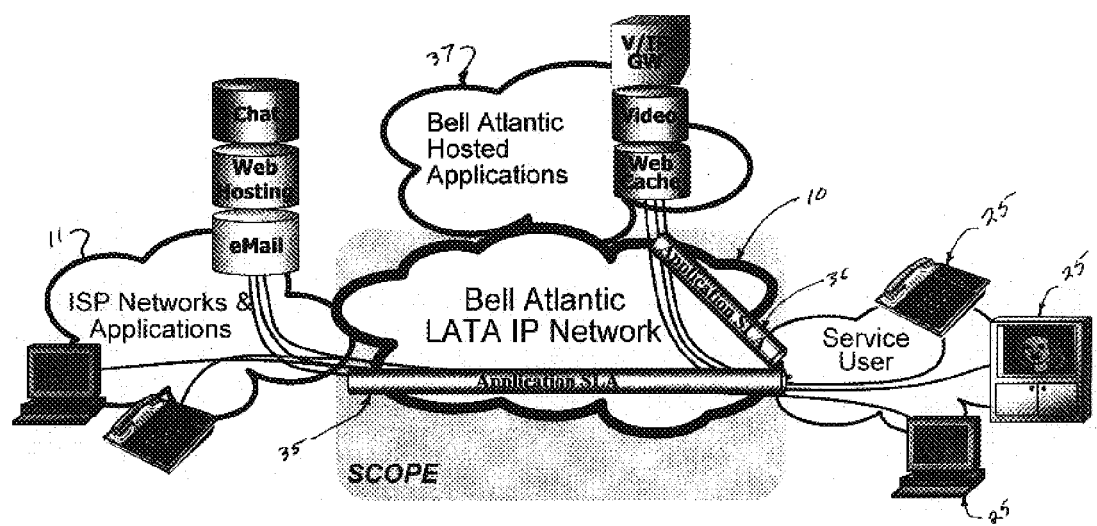
FIG. 3 is a functional block diagram of the network showing the service level agreements (SLAs) for which the network provides appropriate QoS.

FIG. 3 depicts the logical division of the subscriber's traffic, as implemented at the ATM switch 19 in accord with the invention. As shown, the network 10 provides a logical "pipe" or circuit 35 extending to the networks 11 of one or more of the ISPs, for an Internet access application. The ATM switch 19 (FIG. 1) preferably performs a rate shaping or control function. The leg 35 of the subscriber's traffic extending to the ISP 11 provides upstream and downstream communication rates conforming to a service level agreement (SLA) applicable to the subscriber's Internet access application. As such, the communications over the subscriber's logical circuit, extending from the switch to the ISP, provide a first level of QoS. To the subscriber, service over the leg 35 appears the same as a subscriber selected grade of Internet access service as provided by older ADN architectures. FIG. 3 illustrates chat rooms, web surfing and e-mail as examples of services an ISP might offer through the Internet Application SLA circuit 35 and the attendant portion of the subscriber's assigned logical circuit through the access network.

The network 10 also supports communications over one or more logical application paths 36 to local applications 37 hosted in the vertical services domain. Assuming that a subscriber with various equipment 25 also subscribes or otherwise participates in one or more of the vertical services, the local carrier (e.g. Bell Atlantic in FIG. 3) offers a corresponding number of additional application SLAs with the customer. Each SLA for a vertical service may specify QoS parameters for the particular application, such as rate/ bandwidth, latency, jitter, packet loss, packet sequence, security and/or availability. Examples of such applications hosted in the carrier's vertical services domain 37 include the illustrated voice over IP service shown as a V/IP gateway, as well as video services and some caching for high volume local web services. Communications for such applications utilize the one or more paths 36.

The network of FIGS. 1 to 3 also supports closed or private user work groups or virtual local area networks (VLANs). VLANs, for example, may be implemented as a service hosted through the vertical services network 13. All traffic from customer premises belonging to one of the VLANs would include a VLAN Ethertype indicator. Since the frames would not be PPPoE type Ethernet frames, the switch 19 would route the upstream transmission to the vertical services network 13. VLAN frames also carry a VLAN identifier. The nodes of the network 13 transport the packets for the VLAN members only to resources that are members of the identified VLAN. In this manner, the capability exists for creating logical workgroups of users and their shared resources (servers, printers, etc.), that may be physically separated from each other. VLAN groupings can provide privacy and security to their members while enabling "broadcast domains" whereby broadcast traffic is kept logically "inside" the VLAN.

The present invention also supports segregation and aggregation of traffic for three or more domains, based on the higher-level traffic type analysis. An alternative implementation for closed user group services therefore might actually provide a third domain for such services. PPPoE traffic would go to the concentrator equipment 31, as discussed above. The switch 19 would route the upstream transmission frames bearing a VLAN Ethertype indicator to the alternate network serving as the VLAN service domain. That domain would process VLAN communications essentially as done in a normal switched Ethernet type network. Upstream transmissions that bear any other type of Ethertype indicator would go to the vertical services network 13, as in the earlier examples.

A feature of the switch, in accord with the invention, is that it prioritizes traffic for each customer to support QoS for the various services as required by service level agreements (SLAs) between the customer and the carrier. In this regard, one implementation of the L¾ ATM switch 19 performs queuing and tagging operations in accord with the desired prioritization. The switch will maintain two or more queues for each subscriber's permanent virtual circuit. The switch distinguishes the queues based on importance or priority. As the switch receives cell transmissions for transport over the virtual circuit to the customer premises, the switch will internally tag each cell as to its importance level and place each cell in the appropriate queue based on the tag.

The tagging and prioritization may be based on traffic type or 'Type of Service' (ToS). Table 1 illustrates one example of the possible ToS levels that may be assigned to different communications.

TABLE 1

| Relative Priority | ToS Value | AR Queuing | Customer Traffic Encapsulated TOS | Internal BA Mgmt Traffic Rewritten TOS |
|---|---|---|---|---|
| Critical Management | 0 | WFQ (Control 25%) | | OSPF, SNMP, ICMP, BGP |
| Future | 1 | | | |
| Real Time Interactive | 2 | WFQ (High 40%) | Port numbers identified | |
| IP Application Control | 3 | WFQ (Medium 30%) | ICMP, IGMP, EGP, DNS, H.323 signaling, BGP, SIP, Microsoft Media Player Streaming Media Control, RTSP | IGMP, RADIUS |
| One Way Streaming Media | 4 | | UDP (ports 1024+) | |
| One Way Batch | 5 | | HTTP, HTTPS, SNMP, Telnet | |
| Unknown | 6 | WFQ (Low 5%) | Other | Other |
| Non time sensitive | 7 | | FTP, TFTP, SMTP | |

The access switch 19 will examine the content of each communication and determine an appropriate ToS level, for example in accord with the table above. Based on the ToS level, the switch will add a tag to the cell(s) as part of its internal processing. Using the ToS tags, the switch will place each of the cells for a given subscriber into a corresponding one of a plurality of queues that the switch maintains for the subscriber's traffic.

The switch may implement any one of a number of different queue servicing algorithms to select and transmit cells from the various queues. For example, the switch 19 may implement one of several statistical algorithms, equal queuing, weighted queuing, priority selection from queues, etc. The particular algorithm is selected to implement QoS in conformance with the subscriber's service level agreements (SLAs) with the carrier. In most cases, particularly for service applications from the vertical services domain, the switch 19 will not normally drop any cells or packets. In the rare event that the switch 19 becomes congested, any dropping of cells is based on the priority level assigned to the frame, i.e., lowest priority first. Also, if the switch ever drops cells, it drops all cells for an effected lowest priority frame from the relevant queue.

The ability to prioritize traffic across the inserted streams and the PPPoE stream enables the operator to control flows through the ADN 10 so that the local access facility is not overwhelmed with content which exceeds its physical (rate adaptive) limitations. For example, the queuing rules preferably ensure that the 'proper' applications (based on insertion device based rules) obtain access to the limited rate adaptive bandwidth available on any given subscriber's line. Also, the insertion point, switch 19, will usually sit behind the media conversion point (e.g., the DSLAM 17). An OC3 or other facility between the switch 19 and the DSLAM 17 also could become congested. Preferably, the switch 19 or other element at the insertion point queues the traffic in such a manner that no downstream facility (OC3) limitations (which are independent of the rate adaptive DSL loop limitations) will result in packets being dropped.

The queuing will be done based on customer and network provider determined rules so that contention for the facilities facing the subscriber will be addressed via the dropping of the appropriate packets. That way an inserted video stream doesn't overwhelm a PPPoE or Voice stream (due to facility limitations). Among others, appropriate industry understood methods for accomplishing this queuing control include Weighted Fair Queuing (WFQ), Priority (PQ) Queuing, and Weighted Random Early Discard (WRED).

Also, the ability of the switch 19 to examine higher level information provides other advantages in network operations. For example, the switch can implement sophisticated filters on the higher level information, e.g., to provide security. As another example, the switch preferably performs measuring and monitoring to determine what if any packets get dropped (based on the physical rate adaptive limitations), and generates appropriate reports to an external operations system (not shown).

The introduction of the L¾ ATM switch 19 in proximity to the DSLAM(s) 17 also provides benefits in terms of operation of the gateway router 29. Due to the end-to-end use of the Unspecified Bit Rate (UBR) PVCs, the gateway router interface to the cell relay network 30 has been engineered to support a maximum of 2000–4000 PVCs (end users). This is essentially an over-provisioning of bandwidth that probabilistically avoids service degradation that could result from simultaneous demand for bandwidth. The ability of the L¾ ATM switch 19 to perform QoS and rate shaping essentially reduces or ever removes this concern, because it significantly reduces the risk that the gateway router 29 will become a bottleneck. As a result, the ADN 10 can increase bandwidth efficiencies for this interface. Further, the capacity through the gateway router 29 need not be upgraded as often to support demand for increased bandwidth associated with new bandwidth-intensive services, since many such services are now introduced through the vertical services domain 13 and the L¾ ATM switch 19.

Figure 4:
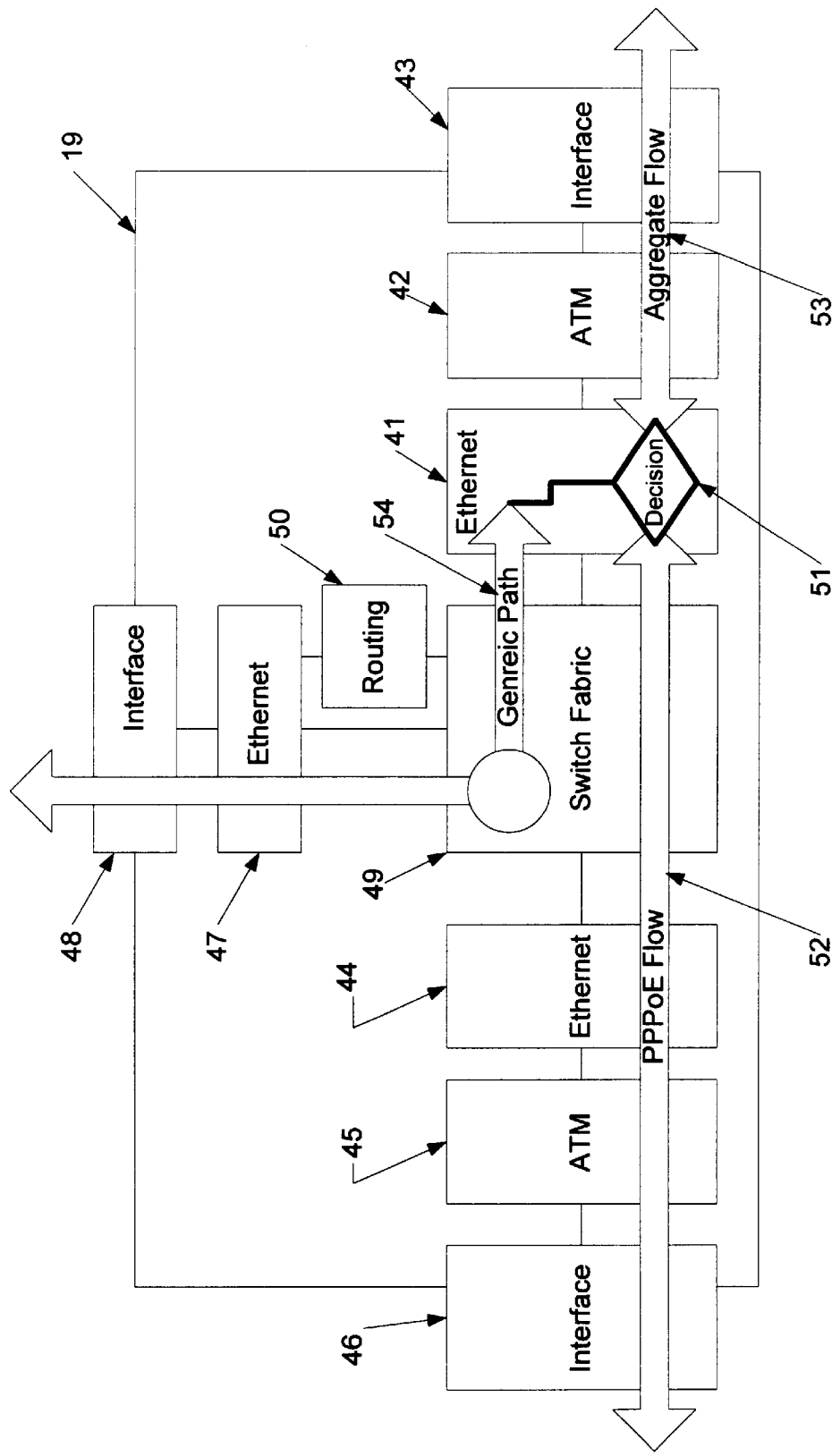
FIG. 4 is a logical diagram of the functional elements of an L¾ switch, for use in the inventive network of FIGS. 1–3.

To fully understand an exemplary implementation of the various inventive concepts, it may be helpful to consider an ATM-based embodiment of the L¾ switch 19. FIG. 4 is a block diagram of the elements and functions of such a preferred embodiment of the switch 19.

The preferred embodiments utilize Ethernet framing. As shown in the drawing, the switch 19 includes an Ethernet interface 41, an ATM interface 42 and an associated physical interface 43 facing toward the subscribers. In an embodiment for use in the network of FIGS. 1 and 2, the physical interface might take the form of one or more OC-3 or OC-12 links to the DSLAMs 17. These links carry all ATM cell traffic going to and from the DSLAMs and hence to and from the customer equipment served through the particular switch 19.

The switch 19 also includes an Ethernet interface 44, an ATM interface 45 and associated physical interface 46 facing toward the gateway router 29 and hence the ISPs 11.

The physical interface 46 might take the form of one or more OC-12 or OC-48 links to the gateway router 29. These links carry all ATM cell traffic going to and from the ISPs or other wide area inter-networks 11. For these communications, the Ethernet interface 44 passes through PPPoE traffic, as specified by the Ethertype indicator in the cells transporting the relevant frame segments.

Facing the vertical services domain, the switch 19 includes an Ethernet interface 47 and a physical interface 48. These interfaces conform to the particular network utilized by the carrier for the vertical services domain, such as giga-bit Ethernet over wire or optical links.

The switch fabric 49 performs the physical switching of data along various paths through the switch 19, in response to instructions from a programmed routing controller 50. FIG. 4 also shows the communications flow through the switch, for each subscriber. The switch 19 also implements a Decision Point 51, shown for example within the Ethernet interface processing 41 on the subscriber facing side. At that point, the PPPoE traffic is separated from all other traffic. From that point, the PPPOE Flow 52 for each subscriber extends as a portion of the subscriber's ATM virtual circuit, facing the cell relay network and hence the ISPs 11. The PPPoE Flow 52 contains Ethernet frames that are of PPPoE Ethertype. Facing towards the subscriber premises, the switch 19 implements an Aggregate Flow path 53, in the form of another portion of the ATM virtual circuit, which contains all ingress/egress subscriber traffic. The switch implements a Generic Path 54 extending through the interfaces to the vertical services network. This path 54 carries all traffic other than PPPoE.

In this example, the switch 19 implements the Decision Point 51 based on recognition of the Ethertype indicator, which is above the layer-2 ATM cell routing information. However, the switch may implement the Decision Point 51 based on still higher-level protocol information.

In a preferred embodiment, the Ethernet and ATM interfaces 41 and 42 and the Ethernet and ATM interfaces 44 and 45 implement segmentation and reassemble (SAR) functions, essentially providing two-way conversions between ATM cell format and Ethernet frame format. Segmentation involves dividing an Ethernet frame into a number of 48-byte blocks and adding ATM headers to the blocks to form a corresponding number of ATM cells. Any blocks that do not include a complete 48-byte payload are padded as necessary. Reassembly entails receiving and buffering ATM cells until it is recognized that a complete frame has been received. The ATM headers of the cells and any padding are stripped, and the payload data is reassembled into the form of an Ethernet frame.

In such an embodiment of the switch 19, the decision point 51 determines how to selectively forward the Ethernet frame information taken from a particular series of upstream ATM cells based on the Ethernet information taken from the ATM cell payloads, for example, by examining the frame header and recognizing the particular Ethertype indicator. Internally, the actual switch fabric 49 for such an embodiment of the switch 19 would comprise an Ethernet switch, even though to other elements of the ADN network 10 the switch 19 appears to perform an ATM switching function.

Those skilled in the art will recognize however, that the decision and switch fabric may be implemented in other ways. For example, a series of cells corresponding to an Ethernet frame could be buffered and the payloads examined just to recognize and identify the Ethertype indicator, without a complete reassemble of the Ethernet frame. This later implementation therefore could utilize an ATM cell-based switch fabric.

From the discussion above, it should already be apparent that certain aspects of the invention relate to setting up logical communication circuits at a relatively low protocol layer corresponding to switching or routing functions and then segregating traffic by distinguishing communication type using higher level protocol information. To insure full understanding on these points, it may be helpful to consider the protocol layer definitions, with particular reference to the illustration of the preferred layers in FIG. 2. The International Standards Organization (ISO) Open Systems Interconnection (OSI) reference model specifies a hierarchy of protocol layers and defines the function of each layer in the network.

The lowest layer defined by the OSI model is the physical layer (L1). This. layer provides transmission of raw data bits over the physical communication channel through the particular network. For example, on the subscriber lines in the preferred embodiment, the physical layer (L1) uses ADSL. Within the customer premises, communications use an Ethernet physical layer (L1), such as 10Base-T. Upstream network elements may use DS3 at some points, but most use SONET, for example OC-3 or OC-12 physical layer transport. Attention is directed to the lower half of the diagram in FIG. 2, which depicts the various protocol stacks throughout the network 10.

The layer defined by the OSI model next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. In the network 10, the data link layer (L2) is used to define certain switching functions through the network. The network layer (L3) provides capabilities required to control connections between end systems through the network, e.g., set-up and tear-down of connections.

The preferred embodiments utilize ATM cell transport as the lowest element of the data link layer (L2), for example to define the connectivity extending from the ATU-Rs 23 through the ADN network 10 to the ISP or corporate networks 11. Subscriber virtual circuits are provisioned at the ATM cell layer, that is to say at the data link layer (L2). Similarly ISP virtual circuits are provisioned at this ATM data link layer (L2), from the gateway router 29 through the cell relay network 30 to the ISP access concentrators 31. The ATM protocol therefore is the layer-2 (L2) protocol used to define the logical connectivity from the subscriber premises to the gateway router 29. The ATM protocol also is the layer-2 (L2) protocol used to define the logical connectivity from the gateway router 29 to the ISP concentrators 31.

For purposes of this discussion, higher level protocols are protocols that ride on or are encapsulated within the particular layer-2 protocol, that is to say in the payloads of the ATM cells in the preferred embodiment. Such higher level protocols include some protocols, which are often considered themselves to be level-2 protocols, where they are transported within ATM cells. The preferred embodiments use Ethernet, a local area network protocol above the ATM portion of the L2 layer. Technically, the Ethernet protocol may be considered as another L2 layer protocol. However, because it is segmented and encapsulated into the payloads of the ATM cells, the Ethernet protocol information actually is a higher level protocol information above the specific level-2 protocol (ATM) that defines the normal connectivity through the ADN network 10.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

In accord with one inventive concept, the network 10 actually utilizes two or more different types of protocol at levels above the protocol within the L2 layer that actually defines the network connectivity. The ADN network 10 may use different protocols at the higher layers as well. By distinguishing transmissions based on differences in these higher-level protocol types, the ATM switch 19 separately forwards different types of communication traffic for each subscriber. In the preferred embodiment, communications to and from the ISP or corporate networks 11 utilize point-to-point protocol (PPP) as the network layer (L3) protocol and a shim for transport of PPP over Ethernet (PPPoE). PPPoE, as one Ethertype protocol could also be considered as a second layer (L2) protocol albeit above the Ethernet layer itself, which in turn rides on the ATM cells used for routing at least through the permanent virtual circuit at the L2 layer.

In the illustrated implementation, however, the use of the PPPoE or a different protocol actually is an indication of a difference in type of the higher layer protocols. In the illustrated example of FIG. 2, the vertical services domain traffic utilizes Ethernet (802.3 SNAP) above the ATM adaptation layer (AAL). As noted, the presently preferred L¾ switch 19 implements its routing decision based on recognition of the Ethertype indicator, that is to say to distinguish the PPPoE traffic from all other types of transmission from the customers' data equipment. In view of the use of ATM as the data link layer (L2) protocol of the network defining the lowest layer of network connectivity for communications services through the ADN network 10, the discrimination based on Ethernet actually implements a decision based on an effectively higher protocol layer.

IP protocol carries the actual higher-level applications information, for transport to and from the vertical services domain and for transport to and from the wide area internetwork. As such, IP and its related transport protocol referred to as the "Transmission Control Protocol" (TCP) ride on top of (are actually encapsulated within) the lower level protocol elements discussed above. Presentation and application layer elements ride on top of the IP layer. IP communication requires that each user device have an assigned IP address. IP addresses, however, are a scarce commodity. Because of the use of IP transport for both wide area services and vertical domain services, the network 10 actually may at times assign two different IP addresses to each active data communication device of an end-user, albeit on a temporary basis. The wide area communications and the vertical services network may also be viewed as two separate 'broadcast' domains.

First, the carrier operating the ADSL data network 10 and the vertical services domain network 13 will maintain a pool of local addresses for assignment, on an as-needed basis, to end user equipment 25. To the carrier, the available IP addresses are a limited resource. Accordingly, the carrier assigns IP addresses on a dynamic basis, only to those users actually on-line at any given time. The carrier preferably utilizes private network type IP addresses and dynamically administers such addresses using dynamic host configuration protocol (DHCP). DHCP is a protocol for automatic TCP/IP configuration, which enables dynamic address allocation and management.

When a particular device 25 becomes active via the ATU-R 23 and the DSLAM 17, it will activate a basic protocol stack, including an IP portion enabling communication with a DHCP server. The device will transmit an address request upstream through the network on the subscriber's virtual circuit. At the Ethernet level, this transmission appears as a broadcast message. The L¾ ATM switch 19, however, will recognize that the packet is not a PPPoE communication and route the cells carrying the packet into the vertical services domain 13. Typically, a DHCP server is coupled to the vertical services domain network 13, for example as part of the carrier's administrative network or systems 33. The DHCP server somewhere on the vertical services domain 13, 33 will answer that broadcast request by selecting and providing an available one of the private IP addresses from the carrier's pool of available addresses. The message with the assigned address will go back to the L¾ ATM switch 19 for insertion into the virtual circuit and transport back to the requesting device 25.

The particular end-user's device 25 uses the assigned private IP address as its source address, for all of its communications with the vertical services network 13, so long as it remains on-line for the present session. When the overall session ends and the end-user device 25 goes completely off-line, the DHCP server returns the private IP address to its pool of available addresses, for reassignment to another user as the next user comes on-line.

As noted, the user equipment 25 receives a private IP address from the DHCP server. The addresses of services on the vertical services domain also are private IP networks. Because these addresses are private, they are accessible only to equipment within that domain and the data network 10. Consequently, the devices are not accessible to hackers or the like coming in through the public Internet.

This dynamic assignment of IP addresses allows the carrier to limit the number of IP addresses used to the number of users actively connected through the ISP's host to the Internet. The use of private IP addresses allows the user equipment to communicate with the vertical services domain utilizing a normal IP-Ethernet protocol stack.

For the as-desired Internet access service, for example using a PPP or similar protocol, IP addresses are administered through the ISPs. The PPPoE protocol preserves or emulates the traditional dial-up approach to ISP access. However, the PPPoE approach does utilize Ethernet and follows Ethernet standards, for example, involving processing of certain broadcast messages.

The user can select an ISP of choice, and her data equipment 25 will initiate a selective session through the Ethernet layer on the network 10 to access the equipment 31 of the selected ISP network 11, in a manner directly analogous to a dial-up modem call through an ordinary telephone network. Hence at a time after initial activation through the networks 10 and 13, the user may activate a browser or other program for using the wide area internetwork service. This activates a second protocol stack, which includes the PPP protocol and the PPPoE shim. The user selects an ISP, and the data equipment initiates communication through the network 10 to the PPPoE equipment 31 of that ISP.

The IP addresses used by each ISP are public network type IP addresses. To the ISP, the pool of available public IP addresses also is a limited resource. Accordingly, each ISP prefers to assign IP addresses on a dynamic basis, only to those users actually on-line at any given time. Typically, as part of each initial access operation for a PPPoE session, the user's equipment 25 and the PPP terminating equipment 31 of the ISP conduct a handshaking, to establish data communications therebetween. As part of this operation, the user's device transmits a broadcast request for a public IP network. The broadcast message, in PPPoE goes through the virtual circuit to the gateway router 29 and through the router and cell relay network 30 to the ISPs PPPoE equipment 31. Although it is a broadcast message, the network effectively limits transport thereof to the virtual circuit going to the ISPs PPPoE equipment 31, that is to a domain separate from the vertical services network domain 13.

The ISP host equipment 31 initiates a procedure to assign the user's computer 25 a numeric Internet Protocol (IP) address from the pool of available public addresses and sends a PPPoE message containing that address back to the subscriber's device 25. When the session ends and the user goes off-line, the ISP host can reassign the address to another user, as the next user comes on-line.

This dynamic assignment of IP addresses allows the ISP to limit the number of public IP addresses used to the number of users actively connected through the ISP's host to the Internet. The end-user equipment will implement a second protocol stack, carrying PPPoE communications. The PPP protocol will allow the end-user equipment to obtain and utilize the public IP address for communications going to and from the public internetwork.

The switch 19 will limit transport of other types of PPPoE broadcast messages to the link to the PPPoE concentrator 31, in a manner similar to that described above for the PPPoE address request. The switch 19 also limits transport of non-PPPoE broadcast messages to the vertical services domain network 131, both for the address request message and for other types of broadcast requests. As such, the logical circuit to the PPPoE concentrator 31 becomes the conduit to one broadcast domain for upstream PPPoE messages; and the vertical services network 13 defines a second broadcast domain for upstream messages of other Ethertypes.

As noted, the end-user equipment 25 will implement two protocol stacks, a native stack without PPPoE and a second stack with PPPoE and a shim. In actual operation, both the native stack with other Ethernet protocols and the wide area stack with PPP and the PPPoE shim often will be active at the same time. The software in the data equipment 25 will utilize one stack or the other depending on whether the user selected a link, e.g. a URL, relating to the wide area internetwork or the vertical services domain. For example, a browser may display a page with embedded links. If a link is to a service on the vertical services domain, the embedded address will be a private address on the vertical services domain. Selection of such a link causes the device 25 to use the native Ethernet stack (without PPP or PPPoE) and the private address. Hence the L¾ ATM switch 19 routes the request triggered by selection of the link to the vertical services domain 13. In contrast, if the link is to a service on the public Internet or other network 11, the embedded address will be a public IP address. Selection of such a link causes the end-user device 25 to use the PPP and PPPOE stack and the public address. Hence the L¾ ATM switch 19 routes the request triggered by selection of the link over the virtual circuits to the PPPoE equipment 31 of the currently selected access provider network 11.

Services provided on the vertical services domain therefore appear as simple IP data services, albeit using the appropriate address space. Virtually any communication service provider may access the vertical services network 13 and through it the carrier's local customer base simply by providing an IP interface for coupling appropriate equipment to the vertical services network. For example, it is a simple matter to connect a direct satellite broadcast receiver system, similar to those used today in residential applications, through an IP interface to provide the full range of received video services over the vertical services network 13. This network may distribute the video programming to a number of L¾ ATM switches 19, within a local geographic area serviced by the ADN network 10. The L¾ ATM switch 19 co-located with the DSLAM 17 provides an optimum point for frame or cell replication for multicasting services.

For a multicast service, such as the satellite-originated video broadcast service, the service provider sends one stream through the vertical services domain network 13 to the L¾ ATM switch 19. The switch 19 will monitor every ATM virtual circuit going to the subscribers, looking for IGNP requests. A subscriber sends an IGNP request to join a selected multicast channel. When the L¾ ATM switch 19 detects such a request, it identifies the requested channel and the requesting subscriber equipment and forwards a 'join' message to the vertical services domain. Subsequently, the switch 19 replicates received packets for the requested broadcast channel, and the switch drops the replicated packets into the cells for each of the virtual circuits of all of the joined subscribers, including the newly added subscriber. When the subscriber later elects to end viewing of the multicast, the subscriber's equipment sends a 'leave' message, and the switch 19 stops adding the cells for the multicast to that subscriber's virtual circuit.

In addition to vertical services, the carrier continues to provide agreed access services to the equipment of the ISPs, in a manner analogous to current practices. For example, the carrier may provide its Internet access service to a subscriber on a monthly subscription basis, at one of several available rates corresponding to the grade of internet access service (and thus the rate of communication to/from the ISP) selected by the customer's subscription.

In an enhanced service offering, the broadcast provider could offer a convenient navigation interface from a web server. The server could be on the vertical services network, but preferably is on the wide area Internet 11. With a PPPoE session active, the user can surf to the provider's server and view information about available programming. The user might select a current broadcast program by 'clicking' on a URL link in the provider's web-based information. Although provided through the wide area Internet 11, the URL would actually contain the private IP address for the desired broadcast program available from the vertical services network 13. Selection of such a URL therefore would generate a message to the appropriate server on the vertical services network 11 to initiate the above discussed procedure to allow the user to 'join' the selected broadcast. A similar methodology might also enable a provider to offer menu, selection and order/billing services from the Internet 11, to provide pay-per-view or video on-demand type services from the vertical services domain network 13.

Although IP-based, the services from the vertical services domain 13 may follow any other desirable business model. For example, a multicast service provider may contract with the carrier to provide multicast audio (radio-like) and/or video (TV-like) services via the vertical services domain. The multicast service provider, not the subscribers, would pay the carrier. The multicast service provider may offer any or all of the multicast programming to customers on some type pay-per-view basis but would likely offer most of the programming service for free or bundled in as part of some nominal monthly subscription charge. The multicast service provider instead would charge advertisers in a manner analogous to current broadcast business practices. Advertising distributed with the IP multicasting, however, can be carefully targeted at end-customers having demographic profiles meeting specific criteria specified by individual advertisers, which allows the multicast service provider to charge premium advertising rates.

Table 2 summarizes the characteristics and requirements of a number of examples of the types of vertical services that the VSD network 13 can deliver via the L¾ ATM switch 19 and the ADSL data network 10.

TABLE 2

| Vertical Service Offering | Characteristics of the Service | Network Requirements |
|---|---|---|
| Voice Services | Local Co-Located VoIP Gateways, VoIP, Unified messaging, IP PBX, IP Centrex | Low latency, low jitter, non-correlated packet loss, and high availability |
| Video On Demand (Unicast) | Local VOD Servers or access to centralized servers. Supports whatever model of server deployment/content delivery mechanism. | High bandwidth, low jitter, high availability, and low packet loss |
| Multimedia Broadcast (Multicast) | Broadcast Video; Broadcast Audio; Satellite Down Link support; Local Servers at the edge. | Varies with content type and with multicast implementation |
| Caching Services | Local servers at the insertion point, Local delivery mechanism for generic media objects such as web pages, images, video files, audio clips, software downloads, etc. | Layer 3/4 visibility |
| Distance Learning (EVC) | Integrated interactive video, voice and data | Low latency, low jitter, non-correlated packet loss, and high availability |
| Telecommuting | Closed user group with access to Transparent LAN Service (TLS). | IEEE 802.1Q |

Figure 5:
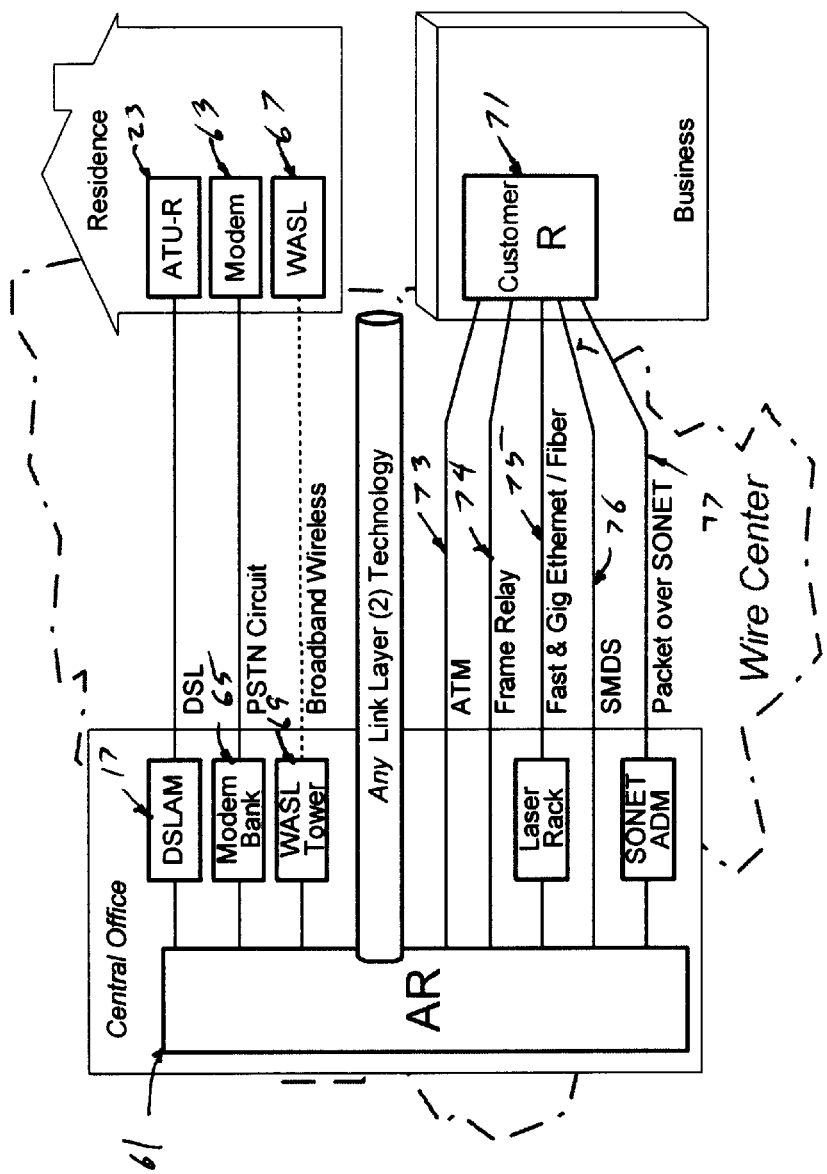
FIG. 5 is a block diagram of a modified portion of the network, useful in explaining migration to other types of physical transport and switching/routing protocols.

The above discussed preferred embodiments implemented the processing above the layer-2 protocol in an enhanced ATM switch and focused on implementation over an xDSL network specifically designed for use of twisted pair wiring to the customer premises. Those skilled in the art, however, will recognize that the principles of the present invention are equally applicable to other types of layer-1 and layer-2 transport/switching technologies as well as selection based on other protocols above the layer-2 protocol. FIG. 5, illustrates the implementation of the layer ¾ and higher switch functionality in a generic access router (AR) 61. The illustration also teaches the provision of digital subscriber line data communication between the access router (AR) 61 and a number of customer premises, using a variety of line technologies. The digital line technologies include dial-up modems 63, 65 as well as wireless communications between wireless asymmetrical subscriber loop (WASL) transceivers 67, 69. The access router (AR) 61 can service residential customers via these other communication technologies as well as through the DSLAM 17 and the ATU-R 23 as in the earlier embodiment. The access router (AR) 61 also serves business customer router equipment 71, using a variety of fast frame/cell packet technologies 73–76 and even optical fiber (SONET) 71.

Those skilled in the art will recognize that even these examples are limited. For example, the invention may apply to pure video networks, such as in a hybrid fiber-coax implementation of a CATV system with digital video service as well as cable modem service.

The access router (AR) 61 will provide one or more types of logical circuits, implemented in the appropriate layer-2 protocol(s), e.g. ATM, frame relay, etc. Although the links to the wide area internetwork and the vertical services domain have been omitted here for simplicity of illustration, the access router (AR) 61 will provide the routing functions to and from the wide area internetwork and the vertical services domain in a manner similar to the functionality of the L¾ ATM switch 19 in the earlier embodiment. In this regard, the access router (AR) 61 will support the QoS levels and will enable local insertion of vertical services.

Figure 6:
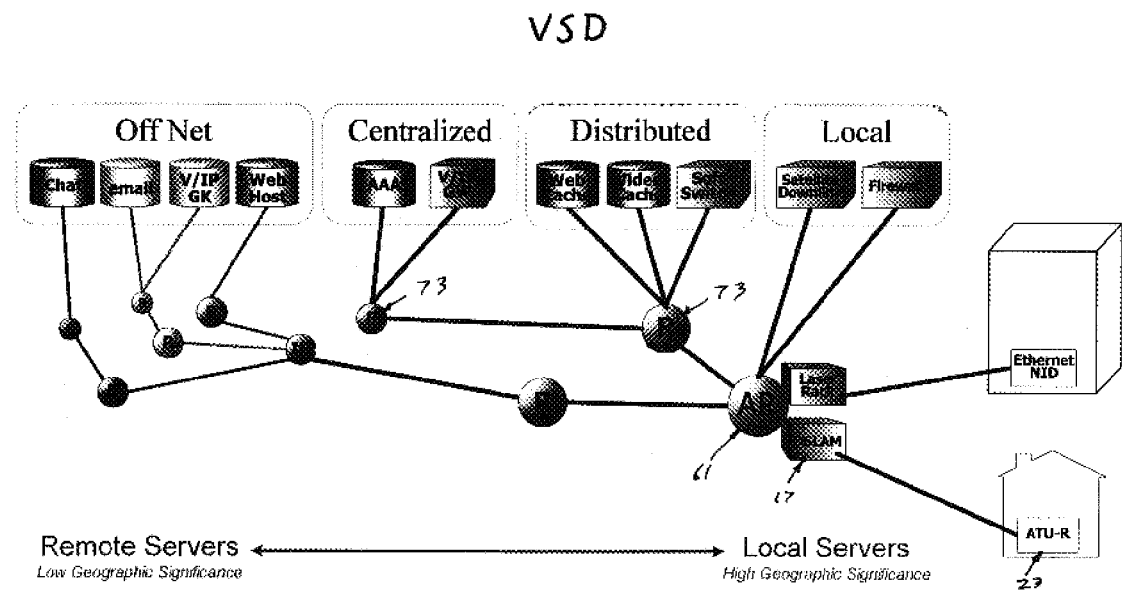
FIG. 6 is a block diagram of a portion of the network of FIG. 5, showing the interconnection thereof with the wide area network and the local vertical services domain.

FIG. 6 depicts a portion of the network of FIG. 5, showing the interconnection thereof with the wide area internetwork and the local vertical services domain. The vertical services network itself may include a number of routers (R) 73. Through that network, the access router (AR) 61 provides communications with services in the VSD that may be purely local, somewhat distributed or even centralized. True long distance data services, such as chat rooms, email and web browsing on the public Internet, however, are considered as Off-Net services, since they are accessed via the Internet access connection under the associated SLA.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A method of providing a combination of access to two different network domains through an access data network, comprising the steps of:

provisioning a logical communication circuit extending from a customer premises through the access data network to a communication access node coupled to a first network domain, wherein the provisioning comprises defining the logical communication circuit in terms of a layer-2 protocol;

at an intermediate node along the logical communication circuit, examining communicated information in transmissions from the customer premises, for a protocol encapsulated within said layer-2 protocol, to distinguish transmission types;

forwarding each detected transmission of a first transmission type from the intermediate node to the communication access node over the logical communication circuit defined in terms of the layer-2 protocol; and forwarding each detected transmission of a second type, different from the first transmission type, to a second network domain logically separate from the first network domain.

2. A method as in claim 1, wherein:

the first network domain comprises a packet-switched wide area internetwork, and the second network domain comprises a locally implemented vertical services domain network.

3. A method as in claim 2, further comprising:

receiving first downstream transmissions intended for the customer premises, over the logical communication circuit from the wide area internetwork at the intermediate node;

receiving second downstream transmissions intended for the customer premises from the vertical services domain at the intermediate node; and inserting the second downstream transmissions into the logical communication circuit, to combine the first and second downstream transmissions for communication over the logical communication circuit from the intermediate node to the customer premises.

4. A method as in claim 1, wherein the step of defining the logical communication circuit in terms of a layer-2 protocol comprises provisioning a permanent virtual circuit from the customer premises of the subscriber to the communication access node.

5. A method as in claim 4, wherein the provisioning of the permanent virtual circuit provisions as Asynchronous Transfer Mode (ATM) permanent virtual circuit from the customer premises of the subscriber to the communication access node.

6. A method as in claim 1, wherein the step of examining communicated information comprises distinguishing between types of local area network protocol transmissions encapsulated within said layer-2 protocol in the transmissions from the customer premises.

7. A method as in claim 6, wherein the first transmission type comprises a type of the local area network protocol adapted for internetwork service provider applications.

8. A method as in claim 7, wherein:

the local area network protocol comprises an Ethernet protocol, and the first transmission type comprises point-to-point protocol over Ethernet.

9. A method as in claim 8, wherein the layer-2 protocol comprises Asynchronous Transfer Mode (ATM).

10. A method as in claim 1, further comprising:

receiving first downstream transmissions intended for the customer premises, over the logical communication circuit from the first network domain;

receiving second downstream transmissions intended for the customer premises from the second network domain at the intermediate node; and inserting the second downstream transmissions into the logical communication circuit, to combine the first and second downstream transmissions for communication over the logical communication circuit from the intermediate node to the customer premises.

11. A method as in claim 10, wherein transmissions of the second type and the second downstream transmissions relate to at least one service selected from the group consisting essentially of: digital voice telephone service, digital video service, digital audio service, and web caching.

12. A method as in claim 10, further comprising regulating flow of transmissions of the second type and flow of the second downstream transmissions, to provide a quality of service conforming to a guaranteed quality of service defined in a service level agreement with the subscriber.

13. A method as in claim 10, wherein the second downstream transmissions carry multicast information.

14. A method of segregating traffic for at least two different network domains, comprising:

establishing a contiguous layer 2 protocol connectivity upstream from a customer premises to a communication access node coupled to a first network domain;

at an intermediate point along the contiguous connectivity, distinguishing upstream transmissions of at least two types from the customer premises based on information encapsulated within said layer-2 protocol;

forwarding each distinguished transmission of a first transmission type from the intermediate point to the first network domain; and forwarding each detected transmission of a second type, other than the first transmission type, from the intermediate point to a second network domain logically separated from the first network domain.

15. A method as in claim 14, wherein said layer-2 protocol comprises asynchronous transfer mode (ATM), and the step of distinguishing comprises distinguishing local area network protocol types based on examination of local area network protocol information contained in payloads of ATM cells.

16. A method as in claim 14, further comprising aggregating downstream transmissions from the first network domain received at the intermediate point via said contiguous layer 2 protocol connectivity with transmissions intended for the customer premises received at the intermediate node from the second network domain, for combined transport from the intermediate node to the customer premises.

17. A method of providing a combination of wide area internetwork service and vertical communication services through a local access network, comprising the steps of:

provisioning a logical communication circuit to support service to the wide area internetwork, the logical communication circuit extending from a customer premises to a communication access node coupled to the wide area internetwork, wherein the provisioning comprises defining the logical communication circuit in terms of a layer-2 protocol;

at an intermediate node along the communication circuit, examining communicated information in transmissions from the customer premises, for protocol layers encapsulated within said layer-2 protocol, to distinguish transmission types;

forwarding each detected transmission of a first transmission type from the intermediate node to the communication access node over the logical communication circuit defined in terms of said layer-2 protocol; and forwarding each detected transmission type of a second type, other than the first transmission type, from the logical communication circuit at the intermediate node to a vertical services network coupled locally to the intermediate node.

18. A method as in claim 17, further comprising:

receiving first downstream transmission intended for the customer premises from the communication access node at the intermediate node, over the logical communication circuit;

receiving second downstream transmissions intended for the customer premises from the vertical services network at the intermediate node; and inserting the second downstream transmissions into the logical communication circuit, to combine the first and second downstream transmissions for communication over the logical communication circuit from the intermediate node to the customer premises.

19. A method as in claim 18, further comprising regulating flow of said transmissions of the first type and flow of the first downstream transmissions, to rates corresponding to a subscriber-selected grade of service.

20. A method as in claim 18, further comprising regulating flow of said transmissions of the second type and flow of the second downstream transmissions, to provide a guaranteed quality of service in conformance with a service level agreement with a subscriber.

21. A method as in claim 18, wherein the transmissions from the customer premises utilize an upstream channel of a digital subscriber line circuit from the customer premises to the intermediate node, and transmissions to the customer premises use a downstream channel of said digital subscriber line circuit.

22. A method as in claim 21, further comprising adapting communications over the digital subscriber line circuit to line conditions, to maximize transmission rates.

23. A method as in claim 21, wherein the digital subscriber line circuit comprises rate-adaptive asymmetrical digital subscriber line modems.

24. A method as in claim 17, wherein the step of defining the logical communication circuit in terms of a layer-2 protocol comprises provisioning a permanent virtual circuit from the customer premises of the subscriber to the communication access node coupled to the wide area internetwork.

25. A method as in claim 17, wherein the step of examining communicated information comprises distinguishing between types of local area network protocol transmissions encapsulated within said layer-2 protocol.

26. A method as in claim 25, wherein the first transmission type comprises a type of the local area network protocol adapted for internetwork service provider applications.

27. A method as in claim 17, wherein the provisioning step further comprises:
  establishing a maximum upstream transmission rate and a maximum downstream transmission rate corresponding to a subscriber-selected grade of service; and
  establishing control parameters in at least one of the nodes for limiting upstream and downstream transmissions over the logical communication circuit between the nodes to the established maximum upstream and downstream transmission rates.

28. A method of providing a combination of wide area internetwork service and vertical communication services through a local access network to a plurality of subscribers, comprising the steps of:
  for each respective subscriber, provisioning a respective logical communication circuit to support a respective subscriber selected grade of service to the wide area internetwork, each logical communication circuit extending from a customer premises of the respective subscriber to a communication access node coupled to the wide area internetwork;
  communicating to and from each customer premises from and to an intermediate node along the logical communication circuits, at optimum rates of physical links to the customer premises, which rates are at or above rates corresponding to respective subscriber-selected grades of service;
  segregating upstream transmissions from respective logical communication circuits intended for a vertical services domain, at the intermediate node, from transmissions on the respective logical communication circuits intended to continue on to the communication access node;
  providing downstream transmissions for the subscribers from the vertical services domain to the intermediate node and receiving the segregated upstream transmissions from subscribers in the vertical services domain from the intermediate node;
  aggregating downstream transmissions from the communication access node and the downstream transmissions from the vertical services domain for each subscriber onto each respective logical communication circuit; and
  regulating traffic for each of the logical communication circuits between the intermediate node and the communication access node, such that rates thereof conform to rates corresponding to the respective subscriber-selected grades of service.

29. A method as in claim 28, wherein the step of aggregating downstream transmissions onto the logical communication circuits comprises replicating a multicast transmission from the vertical services domain onto each of a plurality of the logical communication circuits.

30. A method as in claim 28, further comprising providing guaranteed quality of service for at least some subscriber communications going to and from the vertical services domain via the intermediate node.

31. A method as in claim 28, wherein the aggregating for each respective logical communication circuit comprises:
  establishing at least two queues of transmissions intended for the respective subscriber, the queues having different assigned levels of priority;
  assigning each transmission for the respective subscriber a priority level based on an application of the transmission;
  adding each transmission for the respective subscriber to one of the queues corresponding to a respective assigned priority level;
  selecting transmissions from the queues in accord with an algorithm, so as to maintain at least one predefined quality of service level for the respective subscriber; and
  inserting the transmissions into the respective logical communication circuit in order of the selection in accord with the algorithm.

32. A method as in claim 28, wherein the step of communicating to and from each customer premises comprises implementing rate adaptive digital subscriber line communications over lines extending at least part-way between the customers premises and the intermediate node.

33. A method as in claim 32, wherein the lines between the customers premises and the intermediate node comprise twisted wire pairs.

34. A method as in claim 28, wherein the logical communication circuits comprise virtual circuits.

35. A method as in claim 34, wherein the virtual circuits comprise Asynchronous Transfer Mode (ATM) permanent virtual circuits.

36. A method as in claim 28, wherein the communication access node provides access to at least one of a plurality of available Internet Service Providers.

37. A method as in claim 28, wherein the vertical services domain provides communications for any one or more of the following vertical services: voice over Internet Protocol telephone service, multicast video service, video on demand service, multicast audio service, audio on demand service, multimedia broadcast service and virtual local area network service.

38. A method, comprising:
  providing rate adaptive digital subscriber line communications from a digital subscriber line access multiplexer to a plurality of subscribers, over respective subscriber lines, at maximum rates respective line conditions will allow;
  providing wide area access services for each subscriber, from an access router node coupled with the digital subscriber line access multiplexer to a node coupled to a wide area internetwork, at rates conforming to service level agreements with respective subscribers; and for each subscriber, aggregating and segregating communications for a vertical services domain with the wide area access services at the router access node based on a protocol within a layer-2 protocol, for communication therewith via the maximized-rate digital subscriber line communications.

39. An access data network, for providing access services to at least two different network domains, comprising:

a communication access node coupled to a first network domain;

a plurality of digital subscriber line transceivers coupled to network ends of subscriber lines, for data communication with transceivers coupled to customer premises ends of respective subscriber lines;

an access switch coupled for data communication with the digital subscriber line transceivers, for receiving data from customer premises equipment via respective ones of the digital subscriber line transceivers and for supplying data intended for transmission to predetermined customer premises equipment to the respective ones of the digital subscriber line transceivers;

a high-speed data link between the access switch and the communication access node;

a layer-2 protocol logical communication circuit provisioned through the access switch and the high-speed data link for each subscriber line, wherein each logical communication circuit is provisioned to extend from a respective customer premises to the communication access node;

a second network domain coupled logically to the access switch; and a controller associated with the access switch, for examining communicated information in transmissions from respective customer premises, for a protocol encapsulated within said layer-2 protocol, to distinguish transmission types, and in response to cause the switch to:

forward each detected transmission of a first transmission type to the communication access node over a respective one of the logical communication circuits defined in terms of the layer-2 protocol, and forward each detected transmission of a second type, different from the first transmission type, to the second network domain.

40. A network as in claim 39, wherein the access switch also:

receives first downstream transmissions intended for one customer premises from the communication access node, over a respective logical communication circuit;

receives second downstream transmissions intended for the one customer premises from the second network domain; and inserts the second downstream transmissions into the respective logical communication circuit, to combine the first and second downstream transmissions for transport via one of the digital subscriber line transceivers which serves the one customer premises.

41. A network as in claim 39, wherein each of the logical communication circuits comprises a virtual circuit.

42. A network as in claim 39, wherein the access switch comprises an Asynchronous Transfer Mode (ATM) switch.

43. A network as in claim 42, wherein each of the virtual circuits comprises an Asynchronous Transfer Mode (ATM) permanent virtual circuit.

44. A network as in claim 39, wherein the access switch comprises a router.

45. A network as in claim 39, wherein said controller comprises means for distinguishing between types of local area network protocol transmissions encapsulated within said layer-2 protocol.

46. A network as in claim 45, wherein the first transmission type comprises a type of the local area network protocol adapted for internetwork service provider applications.

47. A network as in claim 46, wherein:

the local area network protocol comprises an Ethernet protocol, and the first transmission type comprises point-to-point protocol over Ethernet.

48. A network as in claim 39, wherein:

the digital subscriber line transceivers comprise asymmetrical digital subscriber line (ADSL) terminal units (ATUs);

the network further comprises a multiplexer providing data communications coupling between the ATUs and the access switch; and the ATUs together with the multiplexer form a digital subscriber line access multiplexer (DSLAM).

49. A network as in claim 39, wherein at least one of the digital subscriber line transceivers is adapted for communication over an optical link.

50. A network as in claim 39, wherein at least one of the digital subscriber line transceivers is adapted for communication over a wireless link.

51. A network as in claim 39, wherein at least one of the digital subscriber line transceivers is adapted for communication over a telephone line.

52. An access data network, for providing a combination of wide area internetwork access service and vertical communication services, comprising:

a communication access node coupled to the wide area network;

a plurality of digital subscriber line transceivers coupled to network ends of subscriber lines, for data communication with transceivers coupled to customer premises ends of respective subscriber lines;

an access switch coupled for data communications with the digital subscriber line transceivers, for receiving data from customer premises equipment via respective ones of the digital subscriber line transceivers and for supplying data intended for transmission to predetermined customer premises equipment to the respective ones of the digital subscriber line transceivers;

a high-speed data link between the access switch and the communication access node;

a logical communication circuit provisioned in terms of layer-2 protocol through the access switch and the high-speed data link for each subscriber line, wherein each logical communication circuit is provisioned to extend from a respective customer premises of the subscriber to the communication access node and to support a respective subscriber-selected grade of service to the wide area internetwork between the access switch and the communication access node;

a vertical services network coupled logically to the access switch; and means associated with the access switch for examining communicated information in transmissions on the logical communication circuit from each respective customer premises, encapsulated with said layer-2 protocol, to distinguish transmission types;

wherein:

the access switch routes each detected transmission of a first transmission type, received from a customer premises over the respective logical communication circuit, over the respective logical communication circuit on the high-speed data link to the communication access node, at a transmission rate corresponding to the respective subscriber-selected grade of service, and the access switch extracts each detected transmission of a type other than the first transmission type from the respective logical communication circuit for routing to the vertical services network.

53. A network as in claim 52, wherein the access switch also:

receives first downstream transmissions intended for respective customer premises from the communication access node, over the logical communication circuits;

receives second downstream transmissions intended for the respective customer premises from the vertical services network; and inserts the second downstream transmission into logical communication circuits for the respective customer premises, to combine the first and second downstream transmissions for communication over the logical communication circuits to the customer premises.

54. A network as in claim 52, wherein the access switch comprises an Asynchronous Transfer Mode (ATM) switch.

55. A network as in claim 52, wherein said means comprises means for distinguishing between types of local area network protocol transmissions encapsulated within said layer-2 protocol.

56. A network as in claim 55, wherein the first transmission type comprises a type of the local area network protocol adapted for internetwork service provider applications.

57. A data communication network, for providing a combination of wide area internetwork service and vertical communication services, comprising:

a communication access node coupled to the wide area internetwork;

a physical communication circuit for coupling a customer premises communication equipment of the subscriber;

a logical communication circuit provisioned to support a subscriber-selected grade of service to the wide area internetwork, the logical communication circuit extending through the physical communication circuit and extending to the communication access node;

wherein the provisioning defines the logical communication circuit in terms of a layer-2 protocol; and an intermediate communication node coupled to the physical communication circuit at an intermediate location along the logical communication circuit, the intermediate communication node comprising:

(a) a controller for examining communicated information in transmissions from the customer premises, for protocol encapsulated within said layer-2 protocol, to distinguish transmission types; and (b) a switch fabric coupled to the logical communication circuit and responsive to said controller, for forwarding each detected transmission of a first transmission type from the intermediate communication node to the communication access node over the logical communication circuit, and for forwarding each detected transmission of a second type, different from the first transmission type, from the logical communication circuit through a port for connection to a vertical services domain.

58. A data communication network as in claim 57, further comprising a multiplexer coupled between the physical communication circuit and the intermediate communication node for providing communications between the intermediate communication node and at least one other physical communication circuit to another customer premises equipment.

59. A data communication network as in claim 57, wherein:

the switch fabric comprises an asynchronous transfer mode (ATM) switch, and the logical communication circuit comprises a permanent virtual circuit defined in Asynchronous Transfer Mode (ATM) protocol through the switch fabric.

60. A data communication network as in claim 57, wherein said controller distinguishes between types of local area network protocol transmissions encapsulated within said layer-2 protocol.

61. A data communication network as in claim 60, wherein the first transmission type comprises a type of the local area network protocol adapted for internetwork service provider applications.

62. A data communication network as in claim 61, wherein:

the local area network protocol comprises an Ethernet protocol, and the first transmission type comprises point-to-point protocol over Ethernet.

63. A data communication network as in claim 57, wherein the physical communication circuit comprises a rate-adaptive asynchronous digital subscriber line transceiver for maximizing transmission rates over the physical communication circuit.

64. A data communication network as in claim 63, wherein the physical communication circuit further comprises:

a twisted wire pair circuit extending from the transceiver to a customer premises of the subscriber;

a splitter/combiner coupled between the transceiver and the twisted wire pair circuit, for maintaining separation on the twisted wire pair circuit between the logical communication circuit and a voice-grade telephone communication channel, and for coupling the logical communication circuit on the twisted wire pair circuit to the transceiver and coupling the voice-grade telephone communication channel on the twisted wire pair circuit to a switch of the public switched telephone network.

65. A data communication network as in claim 57, further comprising a vertical services network coupled to the intermediate communication node to form the vertical service domain, and a content provider interface coupled for communication via the vertical services network.

66. A data communication network as in claim 65, wherein the content provider interface is configured for providing an Internet Protocol (IP) interface on the vertical services network.

67. A data communication network as in claim 66, wherein the content provider interface is configured for providing an interface for digital video content services.

68. A data communication network as in claim 67, wherein the interface for digital video content services comprises a source of digital broadcast video programming.

69. A data communication network as in claim 67, wherein the interface for digital video content services comprises a digital video-on-demand server.

70. A data communication network as in claim 65, wherein the content provider interface is configured for providing a packetized-voice telephone communication service.

71. A data communication network as in claim 57, wherein the intermediate communication node comprises an access router comprising said controller and said switch fabric.

72. A data switch for use in a communication network, comprising:
- a first interface, for data communication to and from data equipment at a plurality of customer premises;
- a second interface, for communication with a first network domain over low-layer protocol logical pipes carrying subscribers traffic for the first network domain in accord with a first type of a higher level protocol;
- a third interface, for communication with a second network domain using a second type of the higher level protocol;
- a switch fabric coupled to the interfaces; and
- a controller coupled to the switch fabric, for controlling routing of traffic through the fabric between the interfaces, wherein:
- upstream transmissions received through the first interface are segregated and routed either to the second interface or to the third interface, depending on whether the transmissions utilize the first or second type of the higher level protocol, respectively, and
- downstream communications received via the second and third interfaces for respective customer premises data equipment are aggregated and forwarded through the first interface.

73. A data switch as in claim 72, further comprising a logical circuit provisioned through the switch fabric from the first interface to the second interface for each customer premises.

74. A data switch as in claim 72, wherein the switch fabric comprises an asynchronous transfer mode (ATM) switch fabric.

75. A data switch as in claim 72, wherein the switch fabric comprises an Ethernet switch fabric.

76. A data switch as in claim 72, wherein: the lower-layer protocol is asynchronous transfer mode (ATM), and the higher level protocol comprises a local area network protocol contained within ATM cells.

77. A data switch as in claim 76, wherein the first type of the higher level protocol comprises a type of the local area network protocol adapted for access to Internet service providers.

78. A data switch for use in a local digital subscriber line communication network, comprising:
- a first interface, for data communication to and from data equipment at a plurality of customer premises;
- a second interface, for communication with a wide area internetwork over layer-2 protocol logical pipes carrying subscribers wide area internetwork traffic in accord with a first type of protocol encapsulated within the layer-2 protocol;
- a third interface, for communication with a vertical services domain network using a second type of protocol encapsulated within the layer-2 protocol;
- a switch fabric coupled to the interfaces; and
- a controller coupled to the switch fabric, for controlling routing of traffic through the fabric between the interfaces, wherein:
- upstream transmissions received through the first interface are bifurcated and forwarded either through the second interface or through the third interface, depending on whether the transmissions utilize the first or second type of the protocol encapsulated within the layer-2 protocol, respectively, and
- downstream communications received via the second and third interfaces for respective customer premises data equipment are aggregated and forwarded via respective ones of the layer-2 protocol logical pipes through the first interface.

* * * * *